(12) United States Patent
Singh

(10) Patent No.: US 12,020,241 B1
(45) Date of Patent: Jun. 25, 2024

(54) SYSTEMS AND METHODS FOR MULTI-ENTITY BLOCKCHAIN-BASED EVENT BREAK PREVENTION

(71) Applicant: CITIBANK, N.A., New York, NY (US)

(72) Inventor: Shishir Singh, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/136,038

(22) Filed: Apr. 18, 2023

Related U.S. Application Data

(63) Continuation-in-part of application No. 18/121,981, filed on Mar. 15, 2023, which is a continuation of
(Continued)

(51) Int. Cl.
 *G06Q 20/38* (2012.01)
 *G06Q 20/36* (2012.01)
(Continued)

(52) U.S. Cl.
 CPC ..... *G06Q 20/3827* (2013.01); *G06Q 20/3674* (2013.01); *H04L 9/0637* (2013.01);
(Continued)

(58) Field of Classification Search
 CPC ............ G06Q 20/3827; G06Q 20/3674; H04L 9/0637; H04L 9/0643; H04L 9/50; H04L 2209/56
 See application file for complete search history.

(56) References Cited

U.S. PATENT DOCUMENTS

2018/0130034 A1* 5/2018 Taylor .............. G06Q 20/38215
2019/0305950 A1* 10/2019 Treat ..................... H04L 9/3239
(Continued)

FOREIGN PATENT DOCUMENTS

CN 101833732 A 9/2010
CN 105631028 A * 6/2016
(Continued)

OTHER PUBLICATIONS

Andreas M. Antonopoulos, Mastering Bitcoin, Dec. 2014, O'Reilly Media, Inc (Year: 2014).*
(Continued)

*Primary Examiner* — Neha Patel
*Assistant Examiner* — Chunling Ding
(74) *Attorney, Agent, or Firm* — Foley & Lardner LLP

(57) ABSTRACT

A computer-implemented method comprising receiving a first event request corresponding to a pending event between a first computing device and a second computing device, the first event request comprising a first set of event attributes corresponding to the pending event; transmitting, each of a plurality of first subsets of event attributes to a different set of nodes; receiving a second event request corresponding to the pending event between the first computing device and the second computing device; and transmitting each of the plurality of second subsets of event attributes to a different set of the plurality of sets of nodes, wherein each of the plurality of sets of nodes compares the first subset of event attributes that the set of nodes receives with the second subset of event attributes that the set of nodes receives; and a block instance corresponding to the pending event to a blockchain.

20 Claims, 11 Drawing Sheets

Related U.S. Application Data application No. 16/986,699, filed on Aug. 6, 2020, now Pat. No. 11,645,650.

(51) Int. Cl.
*H04L 9/06* (2006.01)
*H04L 9/00* (2022.01)

(52) U.S. Cl.
CPC .............. *H04L 9/0643* (2013.01); *H04L 9/50* (2022.05); *H04L 2209/56* (2013.01)

(56) References Cited

U.S. PATENT DOCUMENTS

| | | | |
|---|---|---|---|
| 2019/0311357 A1* | 10/2019 | Madisetti | G06Q 20/381 |
| 2019/0340267 A1* | 11/2019 | Vo | G06F 16/2365 |
| 2019/0347657 A1* | 11/2019 | Guo | G06Q 20/389 |
| 2020/0042635 A1* | 2/2020 | Douglass | H04L 9/3239 |
| 2020/0051129 A1* | 2/2020 | Harris | G06Q 30/0283 |
| 2020/0074458 A1* | 3/2020 | Govindarajan | G06Q 20/3829 |
| 2020/0202396 A1 | 6/2020 | Feng et al. | |
| 2020/0213090 A1* | 7/2020 | Gupta | H04L 9/0643 |
| 2020/0252202 A1* | 8/2020 | Madl | H04L 63/12 |
| 2020/0349564 A1* | 11/2020 | Padmanabhan | H04L 63/123 |
| 2021/0120083 A1* | 4/2021 | Kwun | H04L 67/10 |
| 2021/0150515 A1* | 5/2021 | Lu | G06Q 20/389 |
| 2021/0160252 A1* | 5/2021 | Qiu | H04L 67/565 |
| 2021/0279761 A1 | 9/2021 | Olson | |
| 2021/0357369 A1 | 11/2021 | Kwon et al. | |
| 2021/0369014 A1* | 12/2021 | Vukich | G06Q 30/0234 |
| 2021/0398116 A1* | 12/2021 | Fang | G06Q 20/38215 |
| 2022/0231869 A1 | 7/2022 | Liu | |
| 2023/0035321 A1 | 2/2023 | Vijayaraghavan | |
| 2023/0185942 A1* | 6/2023 | Hanebeck | G06F 21/6218 726/28 |

FOREIGN PATENT DOCUMENTS

| | | | |
|---|---|---|---|
| CN | 111080449 A | * | 4/2020 |
| CN | 111105222 A | * | 5/2020 |
| EP | 3 726 774 A1 | | 10/2020 |
| WO | WO-2018/232494 A1 | | 12/2018 |
| WO | WO-2019/001141 A1 | | 1/2019 |
| WO | WO-2019/195108 A1 | | 10/2019 |
| WO | WO-2020036731 A1 | * | 2/2020 |
| WO | WO-2021026174 A1 | * | 2/2021 |
| WO | WO-2021082340 A1 | * | 5/2021 |

OTHER PUBLICATIONS

Andreas Antonopoulos, Mastering Bitcoin, Dec. 2014, O'Reilly Media, Inc. (Year: 2014).*

Non-Final Office Action on U.S. Appl. No. 16/986,699 mailed Jun. 22, 2022.

Notice of Allowance on U.S. Appl. No. 16/986,699 mailed Feb. 1, 2023.

* cited by examiner

IC Distributed Ledger

Break Analysis »

| Correlation ID | Unique SrcSysId | As Of Date | Product | Basic | Match Type | DLT Ref | Outflow RefNumber | Inflow RefNumber | IC_Key |
|---|---|---|---|---|---|---|---|---|---|
| ⊕ 15776992EE | L834876 | 2020-05-11 | PLCFIX | A-360 | Inception | DLT89998 | 153387AB | L834876 | 10444_10762_BS4507878_GBP |
| ⊜ 15776992EE | D938872 | 2020-05-14 | DEBTFLT | L-125 | Inception | DLT99999 | D938872 | 183387AC | 10473_17652_BS3507877_USD |

Inflow | Outflow | Break

| Inflow | Value | Outflow | Value | Break |
|---|---|---|---|---|
| quest_txn_ccy | USD | oper_txn_ccy | USD | |
| quest_txn_ccy_amt | 250,000,000 | oper_txn_ccy_amt | 250,000,000 | |
| quest_trade_dt | 2020-05-11 | oper_trade_dt | 2020-05-11 | |
| quest_maturity_dt | 2020-05-10 | oper_maturity_dt | 2020-08-10 | 2 mon/3 mon |
| quest_interest_rt | 3.44 | oper_interest_rt | 2.44 | |

FIG. 7

SYSTEMS AND METHODS FOR MULTI-ENTITY BLOCKCHAIN-BASED EVENT BREAK PREVENTION

CROSS-REFERENCE TO RELATED APPLICATIONS

This application claims the benefit of priority as a continuation-in-part of U.S. patent application Ser. No. 18/121,981, filed Mar. 15, 2023, which claims the benefit of priority as a continuation of U.S. patent application Ser. No. 16/986,699, filed Aug. 6, 2020, the entirety of each of which is incorporated by reference herein.

TECHNICAL FIELD

This application relates generally to preventing breaks and maintaining the integrity of transactions across computing systems using blockchain-based technology.

BACKGROUND

As the processing power of computers allows for greater computer functionality and the Internet technology era allows for interconnectivity between computing systems, computing systems rely on highly complex computer infrastructures to facilitate transactions between different entities. It is common practice for entities under the same corporate umbrella to enter into transactions in which the parties to the transaction can loan and receive funds from each other. Such transactions can be complex and have many terms that can change over time. Methods of keeping track of these transactions include manually entering the data into a computer while the computer maintains a running count of the values of the attributes of the transactions. A problem with such manual entry is it is subject to human and/or network error. For example, multiple parties (e.g., two or more parties) to a transaction may enter data of their transaction into their respective databases. The multiple parties may do so following their own coding and transaction booking practices into their own computer systems and databases after an initial agreement on the terms of the transaction. In some instances, there may be a miscommunication about the terms of the transaction, typographical errors from the users that input the terms to the transaction, different timing of the transaction entry due to geographical spread time zones (e.g., when an eastern entity has closed its business while a western entity has just started its business day), differences in the computing systems that the multiple parties use to enter the terms of the transaction, differences in the unique booking practices and transaction attributes of the multiple parties, etc., that causes the multiple parties to enter differing terms for the same transaction. In some cases, mistakes can be deliberate (e.g., a party could gain if an inter-party transaction reversed due to technical reasons).

In another example, the internal calendar or clocks of the computers involved in the transaction may not be synchronized, so each computer may generate transaction data that indicates the transaction covers a different time period. The computer may not be able to distinguish which terms are accurate, and thus the computer may identify the transaction as a transaction break. The computer may not process the transaction break or may be configured to choose the terms entered by one user over the other when determining the impact of the transaction on the entities of the transaction.

With the large volume of transactions that may occur daily between entities, the computer may identify many transaction breaks every day. Each transaction break may slow down the computer's processing as it attempts to maintain counts and accurate data of the transactions that occur between entities. For each transaction break, the computer may have to determine which set of terms to process or otherwise not process the transaction break at all. Such transaction breaks may lead to erroneous results and unreliable data counters and analytics (e.g., for large financial institutions, these breaks may cause cash flow issues or unwarranted capital exposure and borrowing and lending risks that could lead to large financial losses). Existing and conventional methods have failed to provide fast, efficient, and continuous analysis of transaction data that is associated with different transactions.

SUMMARY

For the aforementioned reasons, there is a desire for a computing technology and a software solution to address the above-described challenges through more direct preventive mechanisms that could operate across multiple parties involved in a transaction. There is a desire for a more efficient and accurate system and method for avoiding transaction breaks and continuously processing large transaction datasets, which would allow for an accurate analysis of transaction data than is currently possible with systems that do not implement the systems and methods described herein. The systems and methods provided herein provide for a blockchain-based method for authenticating transactions while ensuring that only transaction blocks for transactions in which both sides have provided matching terms are generated. The system may check the terms generated by the parties to a transaction against each other and, when the terms match, the system may generate a transaction block including identical terms for the transaction.

Using the systems and methods described herein, transaction breaks can be prevented by only executing transactions in which both parties to the transaction are in agreement to the terms of the transaction, ensuring the processing of such transactions can proceed uninterrupted. The systems and methods described herein provide a method for doing so while maintaining the privacy of each computer to the transaction so other computers or nodes that maintain the blockchain may not learn the terms of the transaction. Further, the system can avoid generating and validating transaction blocks for transactions in which parties do not agree on the terms, saving valuable processing time and power.

Furthermore, the system can ensure that neither party to a transaction will have to renege on a smart contract because of terms that conflict with internal rules to the party's system. Such conflicts may cause a transaction between entities to be void and for the entities to upload new smart transaction data for the transaction until a proper transaction has been agreed upon (e.g., a transaction record that includes matching terms and that complies with the rules of each entity). The system and method provided herein ensure that the terms of the transaction do not have to be renegotiated between the parties after the transaction block instance (e.g., generated by a smart contract) has been appended to the blockchain. Instead, the system and method provides for creating regulation blocks that include sets of rules that are specific to each entity and may restrict a block instance for a transaction from being appended to the blockchain if not all of the rules are met. Consequently, nodes of the blockchain may avoid verifying and appending multiple transaction blocks to the blockchain for the same transaction, saving valuable computing resources and increasing the speed with which block instances for transactions are appended to the blockchain.

In one embodiment, a system comprises a plurality of nodes each corresponding to a computing device having a processor and memory to store data, wherein a consensus of the plurality of nodes is configured to: receive a first transaction request from a first computing device, the transaction request corresponding to a pending transaction between the first computing device and a second computing device and comprising a first set of transaction attributes; append a first block instance comprising the first set of transaction attributes to a blockchain of the first computing device; identify a blockchain of the second computing device based on a transaction attribute of the first set of transaction attributes; append a second block instance comprising the first set of transaction attributes to a blockchain of the second computing device; retrieve or receive, from the second computing device, a second transaction request, the second transaction request corresponding to the pending transaction between the first computing device and the second computing device and comprising a second set of transaction attributes corresponding to the pending transaction; when the first set of transaction attributes matches the second set of transaction attributes: identify, using at least one transaction attribute, a second blockchain of the second computing device; automatically execute a protocol to compare the second set of transaction attributes with data stored onto a ledger of the identified second blockchain; and, in response to determining that the second set of transaction attributes complies with data of the ledger of the identified second blockchain, append a third block instance to the blockchain of the first computing device and a fourth block instance to the blockchain of the second computing device, the third block instance and the fourth block instance comprising data corresponding to the second transaction request.

In another embodiment, a method comprises: receiving, by a consensus of a plurality of nodes, a transaction request from a first computing device, the transaction request corresponding to a pending transaction between the first computing device and a second computing device, the transaction request comprising a first set of transaction attributes; appending, by the consensus of the plurality of nodes, a first block instance indicating the pending transaction to the blockchain of the first computing device; identifying, by the consensus of the plurality of nodes, a blockchain of the second computing device based on a transaction attribute of the first set of transaction attributes; appending, by the consensus of the plurality of nodes, a second block instance indicating the pending transaction to a blockchain of the second computing device; retrieving or receiving, by the consensus of the plurality of nodes, from the second computing device, a second transaction request, the second transaction request corresponding to the pending transaction between the first computing device and the second computing device and comprising a second set of transaction attributes corresponding to the pending transaction; when the first set of transaction attributes matches the second set of transaction attributes: identifying, by the consensus of the plurality of nodes, using at least one transaction attribute, a second blockchain; automatically executing, by the consensus of the plurality of nodes, a protocol to compare the second set of transaction attributes with data stored onto a ledger of the identified second blockchain; and, in response to determining that the second set of transaction attributes complies with data of the ledger of the identified second blockchain, appending, by the consensus of the plurality of nodes, a third block instance to the blockchain of the first computing device and a fourth block instance to the blockchain of the second computing device, the third block instance and the fourth block instance comprising data corresponding to the second transaction request.

In another embodiment, a system comprises a plurality of nodes each corresponding to a computing device having a processor and memory to store data, the plurality of nodes comprising a plurality of sets of nodes, each set of nodes maintaining a different blockchain, wherein one or more computing devices of the plurality of nodes are configured to receive, from a first computing device, a first event request corresponding to a pending event between the first computing device and a second computing device, the first event request comprising a first set of event attributes corresponding to the pending event, the first set of event attributes comprising a plurality of first subsets of event attributes; transmit each of the plurality of first subsets of event attributes to a different set of the plurality of sets of nodes; receive, from a second computing device, a second event request corresponding to the pending event between the first computing device and the second computing device, the second event request comprising a second set of event attributes corresponding to the pending event, the second set of event attributes comprising a plurality of second subsets of event attributes; and transmit each of the plurality of second subsets of event attributes to a different set of the plurality of sets of nodes, wherein each of the plurality of sets of nodes automatically executes an electronic protocol to compare the first subset of event attributes that the set of nodes receives with the second subset of event attributes that the set of nodes receives; and responsive to determining the first subset of event attributes that the set of nodes receives matches the second subset of event attributes that the set of nodes receives, appends a block instance corresponding to the pending event to a blockchain maintained by the set of nodes.

In another embodiment, a method comprises receiving, by one or more computing devices of a plurality of nodes and from a first computing device, a first event request corresponding to a pending event between the first computing device and a second computing device, the first event request comprising a first set of event attributes corresponding to the pending event, the first set of event attributes comprising a plurality of first subsets of event attributes, the plurality of nodes comprising a plurality of sets of nodes; transmitting, by the one or more computing devices, each of the plurality of first subsets of event attributes to a different set of the plurality of sets of nodes; receiving, by the one or more computing devices from a second computing device, a second event request corresponding to the pending event between the first computing device and the second computing device, the second event request comprising a second set of event attributes corresponding to the pending event, the second set of event attributes comprising a plurality of second subsets of event attributes; and transmitting, by the one or more computing devices, each of the plurality of second subsets of event attributes to a different set of the plurality of sets of nodes, wherein each of the plurality of sets of nodes: automatically executes an electronic protocol to compare the first subset of event attributes that the set of nodes receives with the second subset of event attributes that the set of nodes receives; and responsive to determining the first subset of event attributes that the set of nodes receives matches the second subset of event attributes that the set of nodes receives, appends a block instance corresponding to the pending event to a blockchain maintained by the set of nodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

FIG. 7 illustrates a screenshot of an example user interface showing another transaction break analysis for the transaction of FIG. 6, according to an embodiment.

DETAILED DESCRIPTION

Figure 1:
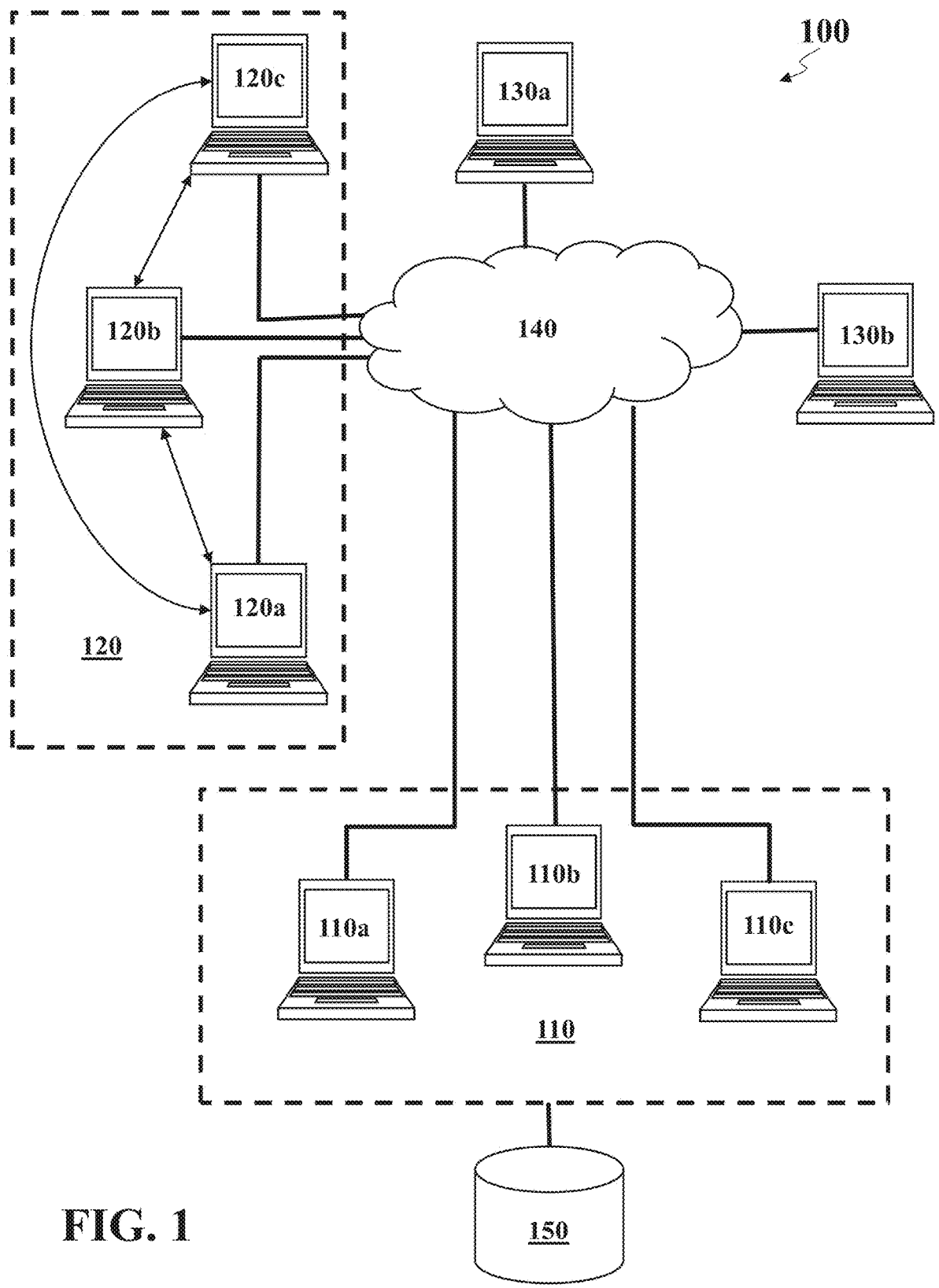
FIG. 1 illustrates an example of a computer system for maintaining the integrity of transactions across computing systems, according to an embodiment.

Reference will now be made to the embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100 for maintaining the integrity of transactions or events across computing systems, according to an embodiment. Events can be an exchange of assets. For example, an event can be or include an exchange of one or more assets, such as buying an asset, selling an asset, making a payment, etc. A transaction can be an example of an event or an event can be an example of a transaction. The system 100 may comprise a plurality of analytic nodes 110a-c, a plurality of peer nodes 120a-c, computing devices 130a-b, a network 140, and a system database 150. Aspects of the system 100 may be configured to employ and manage one or more system blockchains. Network 140 may be any synchronous or asynchronous network. A system blockchain may sometimes be referred to as a "distributed ledger," and may include blockchain-based distributed ledger software (e.g., Hyperledger, Ethereum, Openchain, and TerraLedger). The system blockchain may operate as a distributed database that stores data records associated with users and transaction documents, where the data records stored on the system blockchain may be blocks of data (e.g., block instances or blocks) that are hosted (e.g., locally stored or otherwise in possession of each analytic node 110a-c and/or each peer node 120a-c, such as being remotely hosted or hosted in a cloud) on analytic nodes 110a-c and/or peer nodes 120a-c. The analytic nodes 110a-c may store the same or similar records as the peer nodes 120a-c. For example, each of the peer nodes 120a-c may host a ledger of a distributed ledger that is maintained by peer nodes 120a-c. The analytic nodes 110a-c may each host a ledger of a distributed ledger that corresponds (e.g., has similar data) to the distributed ledger of the peer nodes 120a-c. In some embodiments, the analytic nodes 110a-c may generate duplicates of one or more block instances within a ledger of an analytic node 110a-c and store said block instances in the system database 150.

The analytic nodes 110a-c may generate and display a user interface on the computing devices 130a-b and/or the nodes of the peer nodes 120a-c. An example of the user interface generated and hosted by the analytic nodes 110a-c may be a website (such as the website illustrated in FIGS. 5 and 6). The analytic nodes 110a-c may be configurable administrative devices that analyze and maintain data of transactions between peer nodes 120a-c. The analytic nodes 110a-c may host a website accessible to end-users such as peer nodes 120a-c and/or computing devices 130a-b. The analytic nodes 110a-c may be any computing device comprising a processor and non-transitory machine-readable storage capable of executing the various tasks and processes described herein. Non-limiting examples of such computing devices may include workstation computers, laptop computers, server computers, laptop computers, and the like. Further and as described above, each of the analytic nodes 110a-c may be or include a server or multiple servers. Although three analytic nodes are shown, any number of analytic nodes may be utilized.

The analytic nodes 110a-c may execute software applications configured to display the user interface (e.g., host a website), which may generate and serve various webpages to the computing devices 130a-b and/or the peer nodes 120a-c. The webpages may be used to generate and access data stored on the system database 150 or a blockchain hosted or maintained by the peer nodes 120a-c and/or the analytic nodes 110a-c. In some implementations, the analytic nodes 110a-c may be configured to require user authentication based upon a set of user authorization credentials (e.g., username, password, biometrics, cryptographic certificate, and the like). In such implementations, the analytic nodes 110a-c may access a system database 150 configured to store user credentials, which the analytic nodes 110a-c may be configured to reference to determine whether a set of entered credentials (purportedly authenticating the user) match an appropriate set of credentials that identify and authenticate the user.

A computing device 130a-b may be any computing device that allows a user to interact with the analytic nodes 110a-c via a webpage generated by the analytic nodes 110a-c. The computing device 130*a-b* may execute an Internet browser or local application that accesses the analytic nodes 110*a-c* to issue requests or instructions to the analytic nodes 110*a-c* to access data of the system blockchain (e.g., transmit instructions to the analytic nodes 110*a-c*). The computing device 130*a-b* may transmit credentials from user inputs to the analytic nodes 110*a-c*. The analytic nodes 110*a-c* may authenticate the user and/or determine a user role based on their credentials. The computing device 130*a-b* may comprise any number of input devices configured to receive any number of data inputs, including various types of data allowing for authentication (e.g., username, passwords, certificates, and biometrics). The computing device 130*a-b* may be any computing device comprising a processor and non-transitory machine-readable storage medium allowing the computing device 130*a-b* to perform the various tasks and processes described herein.

As an example of the computing device 130*a-b* operation, the computing device 130*a-b* may execute an Internet browser that accesses a web page hosted by the analytic nodes 110*a-c* hosting a transaction website (or any other user interface). The transaction website may allow a user to upload a transaction record comprising a set of transaction attributes or otherwise input transaction attributes directly into the website. The transaction record may be for a transaction between two peer nodes 120*a-c* or two entities that are entering into a transaction being hosted by a peer node 120*a-c*. The computer files may be stored into document records in a system database 150, which may then be added to block instances of the system blockchain of the analytic nodes 110*a-c* and/or the peer nodes 120*a-c*, where the block instances are accessible according to various blockchain rules. The computing device 130*a-b* may issue queries or instructions to the analytic nodes 110*a-c* via the webpages generated by the analytic nodes 110*a-c*, which can cause the analytic nodes 110*a-c* to query the block instances on the peer nodes 120*a-c*, and, in some instances, perform various tasks, such as retrieving data from or transmitting data to the peer nodes 120*a-c*.

The analytic nodes 110*a-c* may generate and access blockchain instances that are hosted on peer nodes 120*a-c*, according to instructions received from the computing devices 130*a-b*, and/or any of the nodes of the peer nodes 120*a-c*. Software executed by the analytic nodes 110*a-c* may provide blockchain services to users interacting with the analytic nodes 110*a-c*. For example, the analytic nodes 110*a-c* may provide blockchain services to the peer nodes 120*a-c* or the computing devices 130*a-b* via the user interface provided to (e.g., displayed on) these computing devices. In some embodiments, the analytic nodes 110*a-c* may update and query records in the system database 150 according to instructions they receive from the peer nodes 120*a-c* or the computing device 130*a-b*. The analytic nodes 110*a-c* may then generate block instances for the system blockchain maintained by the peer nodes 120*a-c*, where the block instances contain data from transaction records of the system database 150 and/or transaction records received from any of the peer nodes 120*a-c*. The analytic nodes 110*a-c* may transmit instructions to the peer nodes 120*a-c* to update local instances of the system blockchain maintained by the peer nodes 120*a-c* with a block instance that corresponds to the respective transaction record.

In some embodiments, the analytic nodes 110*a-c* host and maintain a blockchain that corresponds to the blockchain that is maintained by the peer nodes 120*a-c*. The analytic nodes 110*a-c* may receive transaction data (e.g., transaction records including transaction attributes) from the peer nodes 120*a-c* and generate a block instance to append to a system blockchain that the analytic nodes 110*a-c* maintain. The system blockchain of the analytic nodes 110*a-c* may be the same or have similar blocks to the system blockchain that is maintained by the peer nodes 120*a-c*. In some embodiments, the system blockchain of the analytic nodes 110*a-c* may be encrypted or otherwise kept private from outside computing devices such as the peer nodes 120*a-c*. Consequently, outside computing devices may not be able to determine attributes of individual transaction records between peer nodes 120*a-c*.

The system database 150 can be a dynamic database that includes transaction records that the system database 150 receives from the peer nodes 120*a-c* and from various other sources (e.g., data source providers). The system database 150 can be a graph database, MySQL, Oracle, Microsoft SQL, PostgreSql, DB2, document store, search engine, key-value store, etc. The system database 150 may be configured to hold any amount of data and can be made up of any number of components. Transaction records stored in the system database 150 may comprise one or more data fields (e.g., attributes and/or attribute values) containing transaction-identifying hash values generated by the analytic nodes 110*a-c* according to a hashing algorithm implemented by the analytic nodes 110*a-c* and/or the peer nodes 120*a-c*. When a new transaction record containing a machine-readable computer file (e.g., PDF, DOC, XSL), is received, the analytic nodes 110*a-c* may store the new transaction record in the system database 150. The analytic nodes 110*a-c* may also generate a hash value for the new transaction record and store the hash value in the system database 150. The hash value may be a unique identifier for the particular transaction record, and may be used by various computing devices of the system 100, such as the system database 150, to reference the computer file or metadata describing the computer file. The computer file may be stored in the system database 150 and/or on a block instance of the system blockchain that is hosted on peer nodes 120*a-c* or the system blockchain that is hosted on analytic nodes 110*a-c*.

The system database 150 may be hosted on any number of computing devices comprising a non-transitory machine-readable storage medium and may be capable of performing the various tasks described herein. The system database 150 may be accessed by the analytic nodes 110*a-c* via a network.

The analytic nodes 110*a-c* may generate new block instances with timestamps or other data that links the new block instances with existing block instances on the blockchain. As an example, when the analytic nodes 110*a-c* generate a new transaction record in the system database 150 (after receiving the new transaction record), the analytic nodes 110*a-c* may generate a hash value for the transaction record based upon one or more attributes (e.g., terms) of the transaction record. The analytic nodes 110*a-c* may then generate and append a new block instance for the system blockchain of the analytic nodes 110*a-c* to the local instances of the blockchain stored within the analytic nodes 110*a-c* (or the system database 150). The analytic nodes 110*a-c* may transmit the new block instance (or data of the new block instance) to one or more of the peer nodes 120*a-c*. The peer nodes 120*a-c*, in turn, may append the newly generated block instance to the existing blockchain stored at the respective peer node 120*a-c*.

In some instances, to maintain the privacy of the attributes of a transaction between peer nodes 120*a-c*, the analytic nodes 110*a-c* may only transmit a hash or some other identifier of the data of a transaction record to the peer nodes 120*a-c*. Each of the peer nodes 120*a-c* may receive the hash or identifier and generate a block instance to append to their respective blockchain based on the hash (and a hash of the immediately previous blockchain to create a link). Consequently, the peer nodes 120*a-c* may not receive information about a private transaction between peer nodes from the analytic nodes 110*a-c* and such data may not be stored on the blockchain that is maintained by the peer nodes 120*a-c*. The peer nodes 120*a-c* associated with the transaction may store the attributes of the transaction in a local database, enabling such peer nodes 120*a-c* to access such attributes without the attributes being publicly available on the system blockchain of the peer nodes 120*a-c*.

The analytic nodes 110*a-c* or peer nodes 120*a-c* may generate block addresses for data to be retrieved from blockchain instances of the system blockchain of the analytic nodes 110*a-c* and/or the peer nodes 120*a-c*. To do so, the analytic nodes 110*a-c* or peer nodes 120*a-c* may generate a hash value for a transaction record, where the application uses the hash value or other identifier values as a block address to reference the file from the respective blockchain. The analytic nodes 110*a-c* or peer nodes 120*a-c* may generate the hash value for the transaction record by generating a hash based on the transaction record (e.g., based on all or a portion of the data of the transaction record) and the data of the immediately preceding block data or block address. This block address may then be stored into the system database 150 in a document record along with the transaction record and any number of additional data field entries related to the transaction record.

In operation, the analytic nodes 110*a-c* or peer nodes 120*a-c* may reference the blocks of their respective blockchains containing a file for a transaction according to the block address of the file. The analytic nodes 110*a-c* may generate any number of block addresses in a similar manner. Block addresses may be generated in any number of combinations of hashed block data and/or hashed block addresses from the new block and one or more preceding blocks, such that the address of the new block is dependent upon, or otherwise linked to, at least the immediately preceding block.

Peer nodes 120*a-c* may represent one or more institutions under the same corporate umbrella (e.g., each peer node 120*a-c* may be a computing device or group of computing devices of an affiliate of the same company). Peer nodes 120*a-c* may represent any group of computing devices (e.g., any group of computing devices that perform transactions with each other and maintain a blockchain for such transactions). Peer nodes 120*a-c* may be or may be a part of analytic nodes 110*a-c*. A peer node 120*a-c* may be any computing device comprising a processor and a non-transitory machine-readable storage medium capable of performing the various tasks and processes described herein. Non-limiting examples of a peer node may be a workstation computer, laptop computer, tablet computer, and server computer. Although three peer nodes are shown, any number of peer nodes may be utilized. Although the peer nodes 120*a-c* are described as storing blocks of the blockchain in FIG. 1, other computing devices, such as an analytic node 110*a-c*, may host blocks of the blockchain or host a corresponding blockchain. Each peer node 120*a-c* may locally store an instance of the system blockchain in the storage medium of the system blockchain, and may further execute a software application that instructs the peer node 120*a-c* on generating and querying blocks within the locally stored blockchain instance. In some embodiments, an analytic node 110*a-c* may be a peer node 120*a-c* or vice versa.

In operation, a peer node 120*a-c* may generate new block instances on a locally stored instance of the system blockchain maintained by the peer nodes 120*a-c* according to data received from an analytic node 110*a-c* or other peer nodes 120*a-c*. In some instances, the analytic nodes 110*a-c* may generate a new local block instance stored on the analytic nodes 110*a-c* (e.g., within the system database 150), and then instruct one or more of the peer nodes 120*a-c* to update the blockchain stored in their local storage (e.g., local database). Moreover, the analytic nodes 110*a-c* may query the block instances of the system blockchain of the peer nodes 120*a-c* according to a block address stored in the system database 150. When the analytic nodes 110*a-c* execute the query of the blocks on the system blockchain, the analytic nodes 110*a-c* may poll the peer nodes 120*a-c* to determine the most recent data on the system blockchain (e.g., latest valid blockchain).

The analytic nodes 110*a-c* may ensure that the data at a block of the system blockchain of the peer nodes 120*a-c* is accurate by using a voting mechanism encoded within the blockchain software executed by the analytic nodes 110*a-c* and/or the peer nodes 120*a-c*. Each peer node 120*a-c* may receive, from the analytic nodes 110*a-c* or the other peer nodes 120*a-c* a query for a block instance and a block address and return a response to the analytic nodes 110*a-c* and/or the peer nodes 120*a-c* indicating whether the block address contains the data that matches data of a corresponding block instance of a quorum (e.g., a majority or a predetermined percentage) of the peer nodes 120*a-c*. Responsive to a determination that the data matches a quorum, the analytic nodes 110*a-c* and/or the peer nodes 120*a-c* may append the block instance to the blockchain that they maintain. The analytic nodes 110*a-c* and/or the peer nodes 120*a-c* may select this method to combat possible fraud and to be certain that data in the blockchain that they maintain is resistant to corruption, as each block instance on each and/or the peer nodes 120*a-c* would need to be corrupted in the same way for a possible security breach. In this way, the analytic nodes 110*a-c* and/or the peer nodes 120*a-c* may also be prevented from acting on obsolete data. For instance, a peer node 120*a-c* may attempt to modify information about a transaction with another peer node 120*a-c*. By modifying the information within the block instance, the hash value of said block instance may change, which would result in the block instance being disconnected from other block instances within the blockchain. Furthermore, when queried by the analytic nodes 110*a-c* and/or the peer nodes 120*a-c*, other peer nodes 120*a-c* may indicate that the modified block instance does not match a version of the data stored on their respective nodes. As a result, the analytic nodes 110*a-c* and/or the peer nodes 120*a-c* may determine that the modified block instance has been tampered with. The analytic nodes 110*a-c* and/or the peer nodes 120*a-c* may then refuse to use the modified block instance. The analytic nodes 110*a-c* may implement a similar voting mechanism to append block instances to the system blockchain of the analytic nodes 110*a-c*.

Before generating a new block instance for a transaction between peer nodes 120*a-c*, the analytic nodes 110*a-c* may verify that each peer node 120*a-c* of the transaction generated a transaction record (e.g., a contract) with matching attributes to the transaction record of the other peer node 120*a-c* of the transaction. For example, when two peer nodes 120*a-c* initiate a transaction, one or both of the peer nodes 120*a-c* may generate a transaction record that has various attributes of the transaction and values for the attributes. Examples of different attributes include, but are not limited to, transaction type (e.g., loan, debt, sum, debt, cash, etc.), length, start date, end date, amount, transacting peer, basis, points, currency, maturity date, treasury rate, customer rate, portfolio, broker, benchmark, etc. The two peer nodes 120a-c may initiate the transaction by receiving a transaction request, a transaction record and/or attributes of a transaction from a respective computing device 130a-b through the website. The peer nodes 120a-c of the transaction may each transmit the respective transaction records that they receive for the transaction to the analytic nodes 110a-c. In some embodiments, the peer nodes 120a-c may transmit an indication or identification (e.g., a transaction request) to the analytic nodes 110a-c indicating that the transaction was initiated (e.g., that the respective peer node 120a-c generated a transaction record for the transaction). In some cases, the indication may include a transaction record generated by the transmitting peer node 120a-c for a pending transaction. In cases in which the transaction request does not include such a transaction record, the analytic nodes 110a-c may receive the indication and retrieve the transaction record from the peer node 120a-c that transmitted the indication. The analytic nodes 110a-c may receive or retrieve the transaction record of each peer node 120a-c of the transaction and compare the corresponding attributes between the transaction records. Responsive to determining the attributes match, the analytic nodes 110a-c may generate a block instance including data of the transaction and append (described in detail with respect to FIG. 2) the block instance to the system blockchain that the analytic nodes 110a-c maintain.

Responsive to the analytic nodes 110a-c determining that not all of the attributes match, the analytic nodes 110a-c may transmit an indication to the peer nodes 120a-c of the transaction indicating that the two peer nodes 120a-c generated transaction records with differing attributes. The indication may include a description or a list of the attributes that differed between the transaction records. The peer nodes 120a-c of the transaction may receive the indication and communicate with each other to obtain the correct values for the attributes. Upon determining the correct values, the respective peer nodes 120a-c may each generate a new transaction record and transmit the transaction record (or an indication of the transaction record) to the analytic nodes 110a-c. The analytic nodes 110a-c may again compare the attributes and repeat the process until the peer nodes 120a-c of the transaction generate transaction records with matching attributes.

In addition to or instead of appending a block instance with data of the transaction to the system blockchain that is maintained by the analytic nodes 110a-c, the analytic nodes 110a-c may transmit instructions to the peer nodes 120a-c of the transaction indicating to append a block instance containing transaction data for the transaction to the system blockchain that is maintained by peer nodes 120a-c. The instructions may include a flag or setting that causes the peer nodes 120a-c of the transaction to generate a block instance based on data of the transaction and append the generated block instance to a local instance of the system blockchain that is stored at the respective peer node 120a-c.

The peer nodes 120a-c of the transaction may receive such instructions and generate a private block instance to append to the local instance of the blockchain. The peer nodes 120a-c may do so to prevent others within the system 100 from accessing the data of a transaction record. To generate the private block instances, depending on their configuration, the peer nodes 120a-c of the transaction may encrypt or generate a hash of the data or a portion of the data of the transaction record. The peer nodes 120a-c may encrypt the data with a symmetric key or a public key to which only the encrypting peer node 120a-c that has the corresponding key (symmetric key or private key) may decrypt the encrypted data. The peer nodes 120a-c may each maintain a copy of the transaction record they generated in a local database to maintain a copy of the attributes of the transaction. The local database may be inaccessible (e.g., maintained in a secure environment) to other peer nodes 120a-c to keep the details of the transaction private. Once the data of the transaction has been encrypted or hashed, the peer nodes 120a-c of the transaction may append a block instance containing the encrypted or hashed data (and any unencrypted or unhashed transaction data from the transaction record) to a local instance of the blockchain and propagate the data used to generate the block instance or an instance of the block instance itself to the other peer nodes 120a-c. Each peer node 120a-c may receive the data or the block instance and append a corresponding block instance to their respective local instance of the blockchain. Consequently, the peer nodes 120a-c of a transaction may maintain privacy of the attributes of transactions that they perform with each other while maintaining the integrity of the transactions for which they generate block instances.

When communicating about a pending transaction, the peer nodes 120a-c of the transaction may communicate through a private channel that is not accessible to the peer nodes 120a-c that are not privy to the transaction. The peer nodes 120a-c of the transaction may gain access to the private channel by being authenticated and authorized by another computing device, such as by the analytic nodes 110a-c. In some embodiments, the communication between the peer nodes 120a-c of a private channel may be encrypted so outside computing devices such as other peer nodes 120a-c may not access or eavesdrop such communication. There may be private channels between each permutation of the peer nodes 120a-c. Via their respective private channels, peer nodes 120a-c may initiate transactions and confirm attributes for the transaction. Once each peer node 120a-c of the transaction agrees on the attributes, each of the peer nodes 120a-c of the transaction may generate a transaction record and send it to the analytic nodes 110a-c as described above. Responsive to receiving an alert indicating that the transaction records do not match, the peer nodes 120a-c of the transaction may communicate over the same private channel to determine which attributes of the transaction need to be updated. Advantageously, by communicating via private channels, the peer nodes 120a-c may keep the attributes of their respective transaction private from each other.

The system blockchain that is maintained by the peer nodes 120a-c may comprise regulation block instances. Regulation block instances may be block instances that include rules and/or thresholds for transactions that are individually associated with one or more of the peer nodes 120a-c. For example, a regulation block for a peer node 120a-c may have a rule that no transactions may go through where the peer node 120a-c takes on a debt with an interest rate that exceeds 7%. In another example, a regulation block for a peer node 120a-c may have a rule where the respective peer node 120a-c may not provide any loans to other peer nodes 120a-c. Each regulation block may be private so only the peer nodes 120a-c that are associated with or use the regulations of the respective regulation may access or view such regulations. Such regulation blocks may only contain such rules and regulations as its data in addition to any hashes that link the regulation block with other blocks of the blockchains. Regulation blocks may be linked to other regulation blocks or transaction blocks.

After verifying that the transaction records between two peer nodes 120a-c match and before transmitting instructions indicating the match to any of the peer nodes 120a-c, the analytic nodes 110a-c may compare the attributes or set of transaction attributes of the transaction records to regulation blocks that are associated with or corresponds to each peer node 120a-c of the transaction. For example, the analytic nodes 110a-c may identify the peer nodes of the transaction record based on peer node identifiers in the transaction records. The peer node identifiers may be attributes of the transaction. The analytic nodes 110a-c may identify block instance addresses of the regulation blocks that are associated with the peer nodes 120a-c of the transaction by comparing the peer node identifiers to a look-up table and identifying the address of the corresponding regulation block instance. The analytic nodes 110a-c may compare the attributes of the corresponding transaction records generated by the peer nodes 120a-c of a transaction to the regulation blocks of the respective peer nodes 120a-c. Responsive to determining that the attributes of one or each of the transaction records comply with the rules and/or thresholds of the respective regulation blocks, the analytic nodes 110a-c may transmit a signal to the peer nodes 120a-c indicating the transaction is verified and/or to generate a block instance based on the transaction. In embodiments in which the analytic nodes append block instances to a blockchain based on transactions between peer nodes 120a-c, in some cases, the analytic nodes 110a-c may only do so responsive to determining transaction attributes of the transaction comply with the rules and/or thresholds of the regulation blocks of each peer node 120a-c of the transaction.

Responsive to one or each of the attributes of the transaction records not complying with the rules or regulations of the regulation blocks, however, the analytic nodes 110a-c may transmit an alert to the peer nodes 120a-c of the transaction indicating an error. In some cases, the alert may indicate which attribute does not comply with a rule or threshold. The analytic nodes 110a-c may only identify the rule or threshold to the peer node that is associated with the attribute that does not comply with it. The other peer node 120a-c of the transaction may just receive an alert indicating that there was an error. Consequently, the rules and thresholds of each peer node 120a-c may remain private.

Each peer node 120a-c may host and maintain its own internal blockchain with nodes internal to the respective peer node 120a-c. The internal blockchain may store a record of transactions that are performed by the respective peer node 120a-c. The internal blockchain may also include regulation blocks for the respective peer node 120a-c as described above. In such embodiments, upon determining that two peer nodes have generated matching transaction records, the analytic nodes 110a-c may identify the blockchain address for an internal blockchain maintained by the peer nodes 120a-c of the transaction based on identifiers in the respective transaction records for the transaction along with the block instance addresses of the regulation block similar to the above. The analytic nodes 110a-c may verify (e.g., compare) each transaction record against the respective rules and/or thresholds of the regulation blocks of the internal blockchains. In some embodiments, upon verifying a transaction, the analytic nodes 110a-c may transmit instructions to the peer nodes 120a-c to generate a block instance comprising data for the transaction. Each peer node 120a-c of the transaction may append a corresponding block instance to its internal blockchain in addition to or instead of the system blockchain maintained between peer nodes 120a-c.

In one embodiment, when a first peer node 120a-c agrees to the terms of a transaction with a second peer node 120a-c, the first peer node 120a-c may execute a first smart contract protocol to append a block instance with a first set of transaction attributes to an internal or local blockchain of the first peer node 120a-c. The first peer node 120a-c may execute a second smart contract protocol to append a block instance with the first set of transaction attributes to an internal or local blockchain that is maintained by the second peer node 120a-c. The second peer node 120a-c may generate a second set of transaction attributes for the transaction and compare the second set of transaction attributes to the first set of transaction attributes of the corresponding block instance in the blockchain of the second peer node 120a-c. Responsive to determining that the first set of transaction attributes match, the second peer node 120a-c may append a block instance for the transaction to the blockchain of the second peer node 120a-c. The second peer node 120a-c may communicate that the sets of transaction attributes matched to the first peer node 120a-c. The first peer node 120a-c can accordingly append a corresponding block instance to the blockchain maintained by the first peer node 120a-c. In some embodiments, some or all of these steps may be performed by the analytic nodes 110a-c (or a consensus of the analytic nodes 110a-c).

The process performed by the analytic nodes 110a-c to verify transactions between peer nodes 120a-c may be performed by a consensus of the analytic nodes 110a-c. A consensus may be a majority, all, or a number above a predetermined threshold (which may be set and adjusted by an administrator) of the analytic nodes 110a-c. In some embodiments, a consensus may only be one of the analytic nodes 110a-c or may be a server. The analytic nodes 110a-c may each perform the process to verify the validity of a transaction between peer nodes 120a-c. Responsive to a consensus of the analytic nodes 110a-c determining that the transaction records between peer nodes 120a-c of a transaction match, the consensus of the analytic nodes 110a-c may append a block instance for the transaction to the system blockchain that they maintain or transmit instructions to the peer nodes 120a-c to cause such block instances to be appended to the blockchains maintained by the peer nodes 120a-c and/or their internal blockchains.

Figure 2:
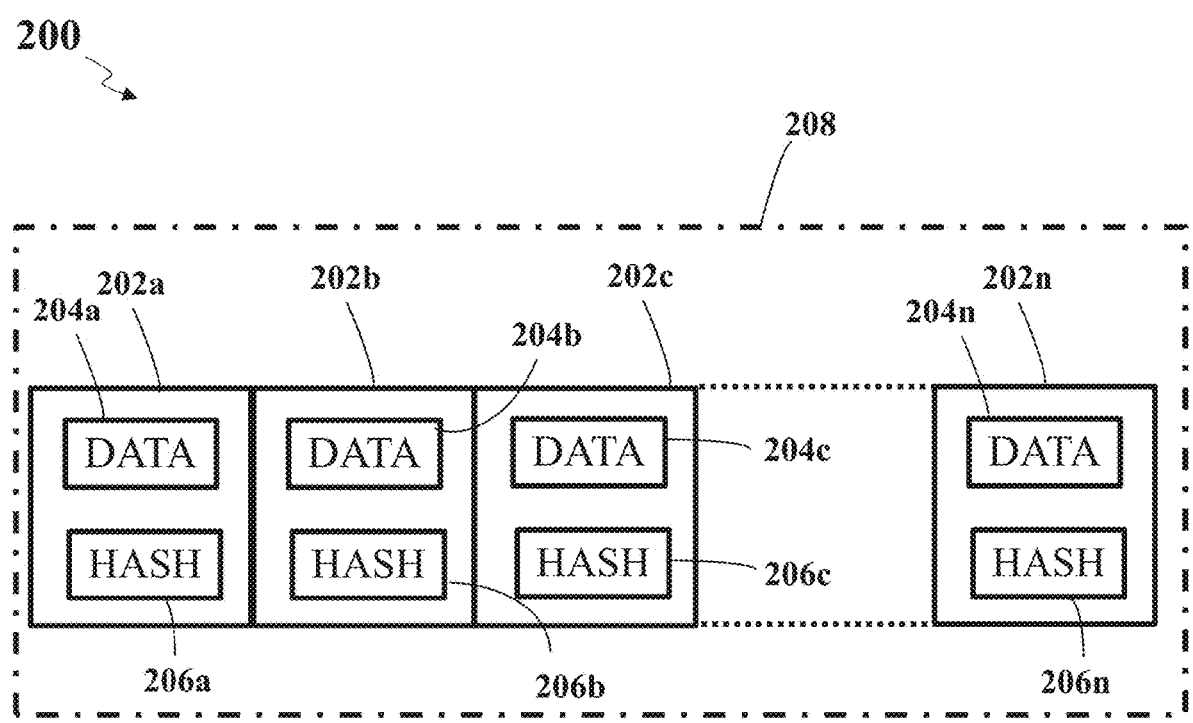
FIG. 2 graphically illustrates an example of appending multiple block instances, according to an embodiment.

Referring now to FIG. 2, an example of a system blockchain comprising different block instances is illustrated. As depicted in FIG. 2, a blockchain 208 comprising block instances 202a-202n (collectively 202) may include data 204a-204n (collectively 204) that enables information, such as transaction data (e.g., transaction attributes and values), machine-readable code/documents, and other metadata associated with one or more transactions of the peer nodes described above. The block instances 202 may also contain hash values 206a-206n (collectively 206) that are used to link each of the block instances to the preceding block instance, as understood in the art.

Analytic nodes or peer nodes may generate (or instruct a blockchain service to generate) the block instance 202a (e.g., the genesis block). The analytic nodes may receive data 204a from a first peer node or a first computing device via a GUI provided by the analytic nodes on the first computing device or peer node. For example, an administrator using the first computing device may log in to a website hosted or otherwise associated/managed by the analytic nodes and transmit data 204b (e.g., a transaction record) to the analytic nodes. The analytic nodes may verify the data 204*b* against data of a corresponding transaction record. Responsive to determining the data matches (and in some cases determining the data complies with the rules and/or thresholds of corresponding regulation blocks), the analytic nodes may generate a block instance for the blockchain that they maintain. The analytic nodes may also or instead transmit instructions to the peer nodes to generate a corresponding block instance and append the block instance to the blockchain that the peer nodes maintain by identifying a quorum and as described herein. Upon generation of the block instance 202*b*, the analytic nodes may generate the hash value 206*b* based on the data 204*b* (and/or data of the immediately previous block instance), an identifier of the first computing device, other identifier information (e.g., time stamp and/or geolocation), and/or a reference to the system database associated with the analytic nodes.

The analytic nodes or peer nodes may also generate (or instruct a blockchain service to generate) the block instance 202*c*. The analytic nodes or peer nodes may receive data 204*c* from a second computing device (e.g., a second peer node) via a GUI provided by the analytic nodes on the second computing device. For example, an administrator using the second computing device may log in to a website hosted or otherwise managed by the analytic nodes and the second computing device may transmit data 204*c* to the analytic nodes. The analytic nodes or peer nodes may generate a hash value 206*c* based on the data 204*c*, an identifier of the second peer node, other identifier information (e.g., time stamp and/or geolocation), and/or a reference to the system database associated with the analytic nodes.

The hash value 206*c* may be based on the hash value 206*b* and/or the data 204*c*. The analytic nodes may incorporate the hash value 206*b* into the hash value 206*c* to append the block instance 202*c* to the block instance 202*b*. The analytic nodes may subsequently poll all the peer nodes to ensure the highest integrity of the blockchain by appending the latest block instance to the latest valid blockchain instances (e.g., the last blockchain for which there was a quorum). Using this method, blockchain instances within the blockchain 208 may be appended to the preceding blockchain instance. The analytic nodes may generate block instances 202*c-n* using the same methods explained above to continuously update the blockchain 208. As depicted, block instances 202*a*, 202*b*, 202*c*, and 202*n* are connected because of synchronization of hash values 206*a*, 206*b*, 206*c*, and 206*n*.

In some configurations, additional information, such as an identifier associated with peer nodes adding or updating the data could also be included within the blockchain or incorporated into the hash value. As an example, if a peer node adds any data to the blockchain, an identifier associated with the computing device that contributed to creating the data may be included in the respective block. In some embodiments, the identifier may include a time stamp (e.g., data regarding the time of data modification or creation) and/or a geolocation (e.g., data regarding the location within which the data modification or creation has occurred or has a value based on the user's geo-location). The identifier may also be incorporated within the hash value and may be used by the analytic nodes as a part of the hashing algorithm. Such identification information may be used as a veracity scale factor that the information is true and accurate.

The analytic nodes may transmit the blockchain instances to all the peer nodes of the blockchain to preserve the integrity of the blockchain. For example, the analytic nodes may transmit the hash value 206*c* (e.g., the hash value generated for block instance 202*c* based on data 204*c* received from a third node) to the first node (e.g., the first computing device associated with the block instance 202*a*) and the second node (e.g., the second computing device associated with the block instance 202*b*). Consequently, when the nodes of the blockchain are polled, they will not verify the modified block.

Modification of data within a block instance may disconnect that block instance from the blockchain. The analytic nodes may use this method to combat possible fraud or unauthorized modification of the data within blockchain instances. For example, if the second administrator using the second computing device modifies data 204*b* within block instance 202*b*, the hash value 206*b* will also be modified. As explained above the hash value 206*b* may be based on (or at least partially based on) data 204*b*; therefore if data 204*b* is modified, hash value 206*b* will also be modified. Modification of the data 204*b* or the hash value 206*c* may break the link between block instance 202*b* and block instance 202*c* because hash value 206*c* is at least in part generated based on hash value 206*b*.

Figure 3:
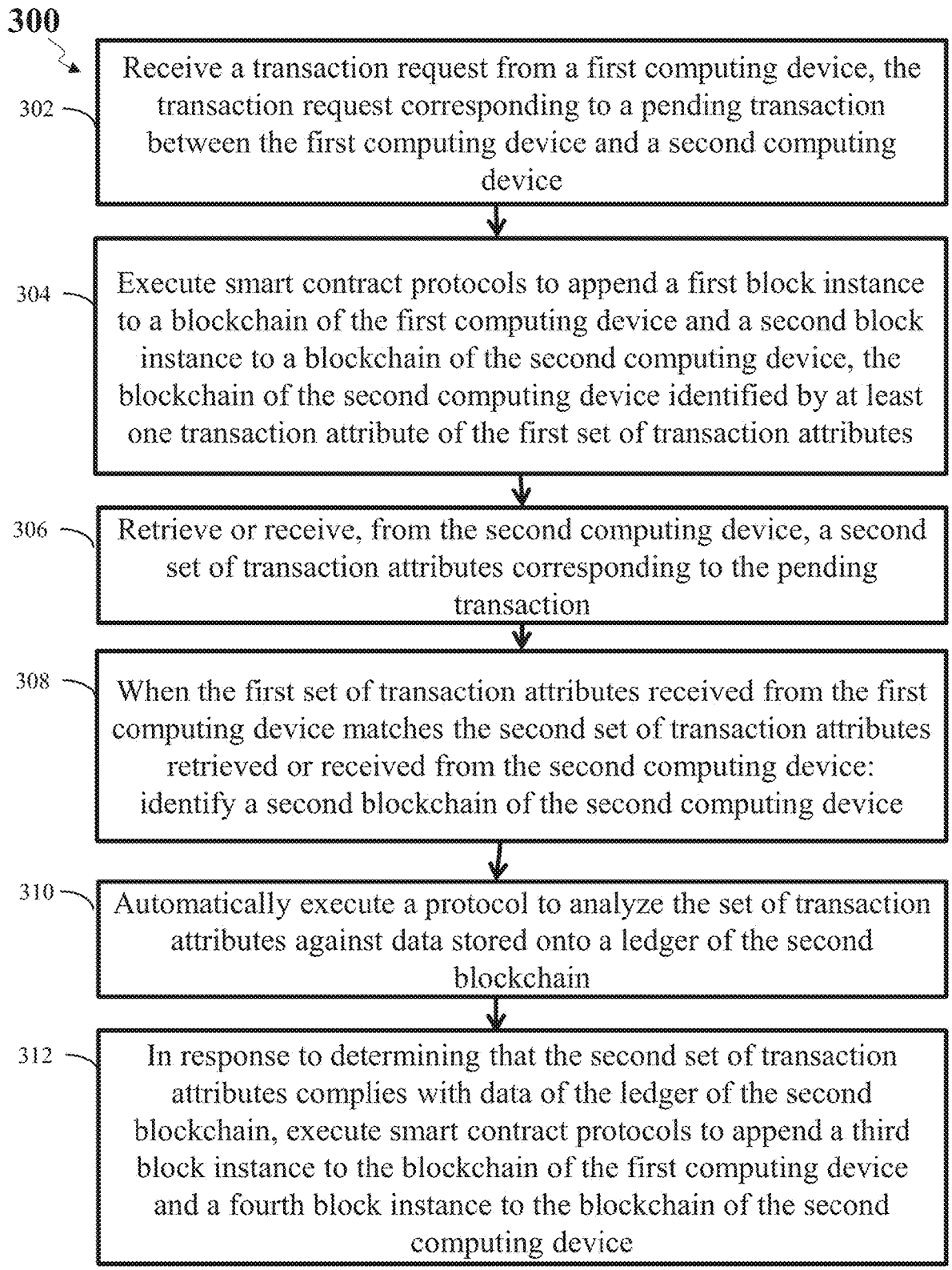
FIG. 3 illustrates a flowchart depicting operational steps for maintaining the integrity of transactions across computing systems, according to an embodiment.

FIG. 3 illustrates execution of a method 300 for maintaining the integrity of transactions across computing systems, according to an embodiment. Other embodiments of executing the method 300 may comprise additional or alternative steps, or may omit some steps altogether. Each of the steps of the method 300 may be performed by one or a combination of the analytic nodes, a first computing device, or a second computing device.

At step 302, the analytic nodes (or a consensus of the analytic nodes) may receive a transaction request from a first computing device. The transaction request may correspond to a pending transaction between the first computing device and a second computing device. The first computing device and the second computing device may be peer nodes of a group of peer nodes that operate to maintain a blockchain that stores data from transactions (e.g., data of transaction records) between the first and second computing devices. There may be any number of peer nodes in the group of peer nodes. As explained above, the analytic nodes may generate a graphical user interface to provide transaction record services to the first and second computing devices. In an embodiment, the graphical user interface may be a website hosted by the analytic nodes, which is available to the peer nodes. The purpose of said website may be to collect transaction data such as data in transaction records, and provide a platform to securely upload transaction data, and/or possibly retrieve transaction data from the peer nodes. The graphical user interface may act as an intermediary between different peer nodes involved in a transaction and may be a central and "one-stop" website for facilitating transactions between peer nodes, storing data of the transactions, and/or retrieving such data. While the described graphical user interface is described herein as a central management tool, neither the analytic nodes nor the graphical user interface deviate from the spirit of the distributed nature of the blockchain technology. The analytic nodes provide a management tool to reduce the computational burden of keeping record within different and unrelated databases; blockchain instances may be stored in individual peer node databases.

Peer nodes may communicate with each other across a private channel. The peer nodes may access the private channel via the website provided by the analytic nodes. Each peer node may have a private channel with each other peer node to facilitate communications for transactions without the other peer nodes being able to view or access the communications within the channel. The communications on the private channel may be encrypted so only the members of the private channel may read and transmit data between each other via the private channel. For example, Peer Node A may initiate a transaction with Peer Node B. Peer Node A may transmit a message to Peer Node B across their private channel that only they can access to initiate communications for the transaction. Peer Node B may receive the message and communicate back so each of the peer nodes may negotiate terms or attributes for the communication without any other peer node having access to the communications.

The analytic nodes may be administrative nodes that maintain a blockchain comprising data of the transactions between the peer nodes. As described herein, the analytic nodes may verify the data of the transactions and, upon verification, append block instances comprising the data of the transactions to the blockchain.

The first computing device may transmit a transaction or verification request to the analytic nodes in response to reaching an agreement with the second computing device. The first computing device may generate a transaction record (e.g., a transaction request) that corresponds to the pending transaction between the first and second computing devices. The transaction record may comprise transaction attributes or a set of transaction attributes as described above. The first computing device may generate the transaction record automatically based on the agreement between the first computing device and the second computing device or in response to receiving manual user inputs comprising the attributes associated with the transaction. The first computing device may format the transaction record according to the attributes and include the transaction record in the transaction or verification request to the analytic nodes. In some embodiments, the first computing device may also store a copy of the transaction record in a local database that may be encrypted so it is only accessible to the first computing device.

Further, upon reaching an agreement with the first computing device for a transaction, the second computing device may also generate a transaction record that corresponds to the transaction. The second computing device may generate the transaction record in a similar manner to the first computing device and store the transaction record in a secure local database (per the above). In some embodiments, the second computing device may transmit the generated transaction record to the analytic nodes for further processing.

At step 304, the analytic nodes (or a consensus of the analytic nodes) may execute smart contract protocols to append a first block instance to a blockchain of the first computing device and a second block instance to a blockchain of the second computing device. To do so, the analytic nodes may execute a first smart contract protocol to append a block instance to the blockchain of the first computing device. The blockchain of the first computing device may be a ledger that is shared among the nodes of the first computing device or the entity that controls or operates the first computing device. In some embodiments, the blockchain of the first computing device is a local instance of a blockchain that is maintained by the analytic nodes and/or the first and second computing devices. The analytic nodes may append the first block instance to the blockchain of the first computing device based on the hash of the previous block instance, the data of the transaction (e.g., the set of transaction attributes), a timestamp, and/or any other data.

The analytic nodes may identify the blockchain of the second computing device based on the first set of transaction attributes. The first set of transaction attributes may include a transaction attribute identifying the blockchain of the second computing device and/or the entity that controls or operates the second computing devices. For example, the transaction attribute may be a blockchain address that points to the blockchain of the second computing device. The analytic nodes may identify the blockchain address from the transaction attributes to identify the blockchain of the second computing device.

The analytic nodes may execute a second smart contract protocol to append the second block instance corresponding to the first set of transaction attributes (e.g., the pending transaction) to the blockchain of the second computing device. The blockchain of the second computing device may be similar to the blockchain of the first computing device. For example, the blockchain of the second computing device may be a blockchain maintained by nodes of the second computing device or a local instance of a blockchain that is maintained by the analytic nodes and/or the first and second computing devices. The analytic nodes may do so based on the hash of the previous block of the blockchain of the second computing device and other data similar to the block instance that the analytic nodes append to the blockchain of the first computing device.

At step 306, the analytic nodes (or a consensus of the analytic nodes) may retrieve or receive a second set of transaction attributes corresponding to the pending transaction from the second computing device. The analytic nodes may receive the transaction record from the first computing device and retrieve a corresponding transaction record from the local database of the second computing device. The analytic nodes may retrieve the transaction record by transmitting a request to the second computing device or by transmitting instructions to the second computing device indicating for the second computing device to transmit its transaction record for the transaction. The second computing device may receive the request or instructions, retrieve or receive the second transaction record, and transmit the transaction record to the analytic nodes. The transaction record generated by the second computing device may comprise the second set of transaction attributes for the pending transaction between the first computing device and the second computing device.

In some embodiments, both the first and the second computing devices transmit their respective transaction records to the analytic nodes. In such embodiments, the analytic nodes may match the transaction records together as being associated with the same transaction based on a matching identifier (e.g., a transaction identifier specific to the transaction) between the transaction records.

In some embodiments, the analytic nodes may retrieve the second set of transaction attributes from a block instance that the analytic nodes or the first or second computing device appends to the blockchain of the second computing device. For example, the consensus of the analytic nodes or the second computing device may execute a smart contract protocol to append a block instance with the second set of transaction attributes that corresponds to the transaction to the blockchain of the second computing device. The analytic nodes may receive or retrieve the second set of transaction attributes from the appended block instance.

At step 308, the analytic nodes (or a consensus of the analytic nodes) may identify a second blockchain using a transaction attribute from the first set of transaction attributes. The second blockchain may be associated with the pending transaction (e.g., the second blockchain may be maintained by a peer node of the transaction). The analytic nodes may do so when the analytic nodes determine that the first set of transaction attributes received from the first computing device matches the second set of transaction attributes retrieved or received from the second computing device. The analytic nodes may identify the transaction attributes of the transaction record generated by the first computing device (e.g., the first set of transaction attributes) and the transaction attributes of the transaction record generated by the second computing device (e.g., the second set of transaction attributes). The analytic nodes may compare the corresponding transaction attributes of the first and second sets of transaction attributes. The analytic nodes may determine the first and second sets of transaction attributes match if each attribute of the sets of transaction attributes is the same as the corresponding transaction attribute of the other set of transaction attributes. For example, the analytic nodes may determine that a transaction start date of one set of transaction attributes matches the transaction start date of another set of transaction attributes if they have the same values. The analytic nodes may perform a similar comparison for each corresponding transaction attribute of the sets of transaction attributes. Responsive to each corresponding transaction attribute matching, the analytic nodes may use an address transaction attribute of the second set of transaction attributes to identify a second blockchain.

Responsive to determining that at least one transaction attribute between the first and second sets of transactions does not match, the analytic nodes may transmit a message or an alert to the first and/or second computing devices indicating there is a problem. The message may be a general message that indicates an error occurred or a message that comprises a list of attributes that did not match. The first and/or second computing devices may receive the message and communicate with each other, such as via their private channel, to identify the differences between the corresponding transaction attributes. The first and/or second computing devices may each generate a new transaction record for the transaction and transmit their respective transaction records to the analytic nodes for comparing. The analytic nodes may receive or retrieve the new transaction records from the first and/or second computing devices and determine if they have matching attributes. The analytic nodes and the first and second computing devices may repeat this process until the analytic nodes determine the sets of the transaction attributes of the transaction records match.

In some embodiments, the analytic nodes compare the second set of transaction attributes to the first set of transaction attributes that is stored in a block instance of the blockchain or ledger of the second computing device. The analytic nodes may receive or retrieve the second set of transaction attributes and receive or retrieve the first set of transaction attributes from the second block instance of the blockchain of the second computing device that corresponds to the pending transaction. The analytic nodes may determine if the second set of transaction attributes match (e.g., are the same as) the first set of transaction attributes based on a comparison between corresponding transaction attributes of the sets of transaction attributes.

In some embodiments, the analytic nodes determine whether transaction attributes match based on the types of the transaction attributes. As described above, the types of the attributes may include transaction type (e.g., loan, debt, sum, debt, cash, etc.), length, start date, end date, amount, transacting peer, basis, points, currency, maturity date, treasury rate, customer rate, portfolio, broker, benchmark, etc. Each transaction type may include a matching relationship, which may be stored in a database that is maintained or accessible to the analytic nodes. The matching relationship may indicate whether the values associated with corresponding attributes need to be the same to match or whether the values need to be different to match. For example, the matching relationship for a start date transaction attribute may indicate the start dates between two sets of attributes needs to be the same. In another example, a transaction type for one set of transaction attributes may be a loan. A matching transaction type to the loan may be a debt. While the strings of "loan" and "debt" may not be the same, the loan and debt strings may be mapped together in the database accessed by the analytic nodes. The analytic nodes may identify the match by comparing the values to the database. In another example, the attributes may match if they have opposite values to each other. For example, a negative loan amount may match a positive debt amount because one party is gaining money while the other party is lending money.

Upon determining the sets of transaction attributes match, the analytic nodes may identify a transaction attribute from one or both sets of transaction attributes that identifies a second blockchain. The second blockchain may be a system blockchain that the first and second computing devices maintain with other peer nodes or an internal blockchain that the first or second computing device maintains with another set of nodes or computing devices. In some embodiments, the second blockchain may be the blockchain of the first computing device and/or the blockchain of the second computing device or a separate blockchain maintained by the first or second computing device. The transaction attribute may be a pointer to the second blockchain. The analytic nodes may use the pointer to view and/or access the data of the second blockchain such as data of a ledger of the second blockchain. In embodiments in which the analytic nodes identify internal blockchains of the first and second computing devices, the analytic nodes may identify the internal blockchains of each of the first and second computing devices. Otherwise, the analytic nodes may identify the blockchain that is hosted and/or maintained by the first and second computing devices together and, in some cases, with other nodes or computing devices.

In some embodiments, the transaction attribute or another transaction attribute of the set of transaction attributes identifies a block instance within the second blockchain. For example, the transaction attribute may be a block instance address. The analytic nodes may identify the block instance address and access the data of the block associated with the block instance address.

The transaction attribute may point to a regulation block. A regulation block may be a block instance within the second blockchain that contains data identifying rules and/or thresholds with which transactions must comply. Regulation blocks may be specific to a computing device or node and may be kept private from other computing devices or nodes such as through encryption. Each set of transaction attributes may have a transaction attribute that points to a regulation block that is specific to the computing device that generated the set of transaction attributes. For example, a computing device may generate a regulation block indicating rules and thresholds for transactions that the computing device performs. The computing device can encrypt the regulation block and append it to the blockchain that is maintained by the other members of a group of computing devices. The analytic server may identify the regulation block generated by the computing device responsive to the computing device transmitting a transaction record or set of transaction attributes to the analytic server and determine the set of transaction attributes match a corresponding set of transaction attributes.

At step 310, the analytic nodes may automatically execute a protocol to compare the second set of transaction attributes with data stored onto a ledger of the second blockchain. The protocol may be stored instructions that cause the analytic nodes to compare the transaction attributes to the regulation blocks of the ledger of the second blockchain. The second blockchain may comprise a list of the transactions that are performed by the nodes of the second blockchain and/or the regulation blocks that were established by the nodes. The ledger may be the ledger of the second computing device. The ledger may be the ledger of any node that maintains the second blockchain.

The analytic nodes may compare the second set of transaction attributes to the rules and/or thresholds of the regulation block of the second blockchain that corresponds to the second computing device. For example, the regulation may comprise a rule indicating that the second computing device cannot give out a loan with more than five points or that has an interest rate lower than 4%. The analytic nodes may compare the point transaction attribute and the interest rate transaction attribute of the second set of transaction attributes to these rules and determine if they comply with the regulation block. The regulation blocks may have any rule or threshold for any number of transaction attributes.

The analytic nodes may perform a similar process for the first set of transaction attributes. The analytic nodes may identify the second blockchain (which may be the same as the blockchain identified for the first set of transaction attributes) associated with the first set of transaction attributes and the regulation block instance that is associated with the first computing device. The analytic nodes may compare the attributes of the first set of transaction attributes to the regulation block and determine whether the first set of transaction attributes complies with the respective regulation block.

At step 312, the analytic nodes may execute smart contract protocols to append a third block instance to the blockchain of the first computing device and a fourth block instance to the blockchain of the second computing device. The third block instance and the fourth block instance may comprise data corresponding to the transaction request. The analytic nodes may append the third block instance to the blockchain of the first computing device in response to determining that the second set of transaction attributes complies with data of the ledger of the identified second blockchain. The analytic nodes may determine that the second set of transaction attributes complies with the data of the ledger responsive to determining that none of the transaction attributes of the second set of transaction attributes violate the rules and/or thresholds of the regulation block. In some instances, the analytic nodes may do so responsive to determining neither set of transaction attributes violates a rule and/or threshold of a corresponding regulation block.

The analytic nodes may transmit instructions to the first computing device and/or the second computing device to append the third block instance to the blockchain of the first computing device and/or the fourth block instance to the blockchain of the second computing device. The instructions may comprise the data of the transaction between the first and second computing devices. The analytic nodes may transmit such instructions to each computing device that maintains the respective blockchain. The instructions may cause the computing devices to append such a block instance to their respective blockchain and verify the new block instance as a quorum.

The instructions to the computing devices may contain a hash of the data or a portion of the data of the transaction between the first and second computing devices. Consequently, devices that were not privy to the transaction (e.g., eavesdroppers) may not learn the details of the transaction but may learn that the transaction occurred and have a record of it. The first and second computing devices may append the block instance comprising the hash to their respective blockchains. The first and second computing devices may also store the details of the transaction in a local database off of their blockchains for review. Consequently, the first and second computing devices may store a record of the transaction without sharing the attributes and other details with other computing devices that were not a party to the transaction.

In addition to or instead of appending the third block instance to the blockchain of the first computing device and the fourth block instance to the blockchain of the second computing device, the consensus may append a block instance that corresponds to the pending transaction to a blockchain that is maintained between the analytic nodes (e.g., administrative nodes and/or the first and/or second computing devices). In some embodiments, in instances in which the first and second computing devices maintain the first blockchain with other peer nodes, the data of the block instance may be hashed so peer nodes that maintain the first blockchain but were not a party to the transaction may not learn the transaction attributes of the transaction.

In response to determining that one of the transaction attributes violates a rule or threshold of a regulation block, the analytic nodes may transmit a message or an alert to the first computing device and/or the second computing device indicating that the transaction could not be verified. The analytic nodes may include an indication of the transaction attribute that violated a rule or threshold and/or a description of the rule or threshold in the message or alert to the second computing device. However, the analytic nodes may not include such a description in the message or alert to the first computing device to maintain the privacy of the rules and/or thresholds of the regulation bock of the second computing device. The analytic nodes may perform a similar process for the first set of transaction attributes and the first computing device.

Figure 4:
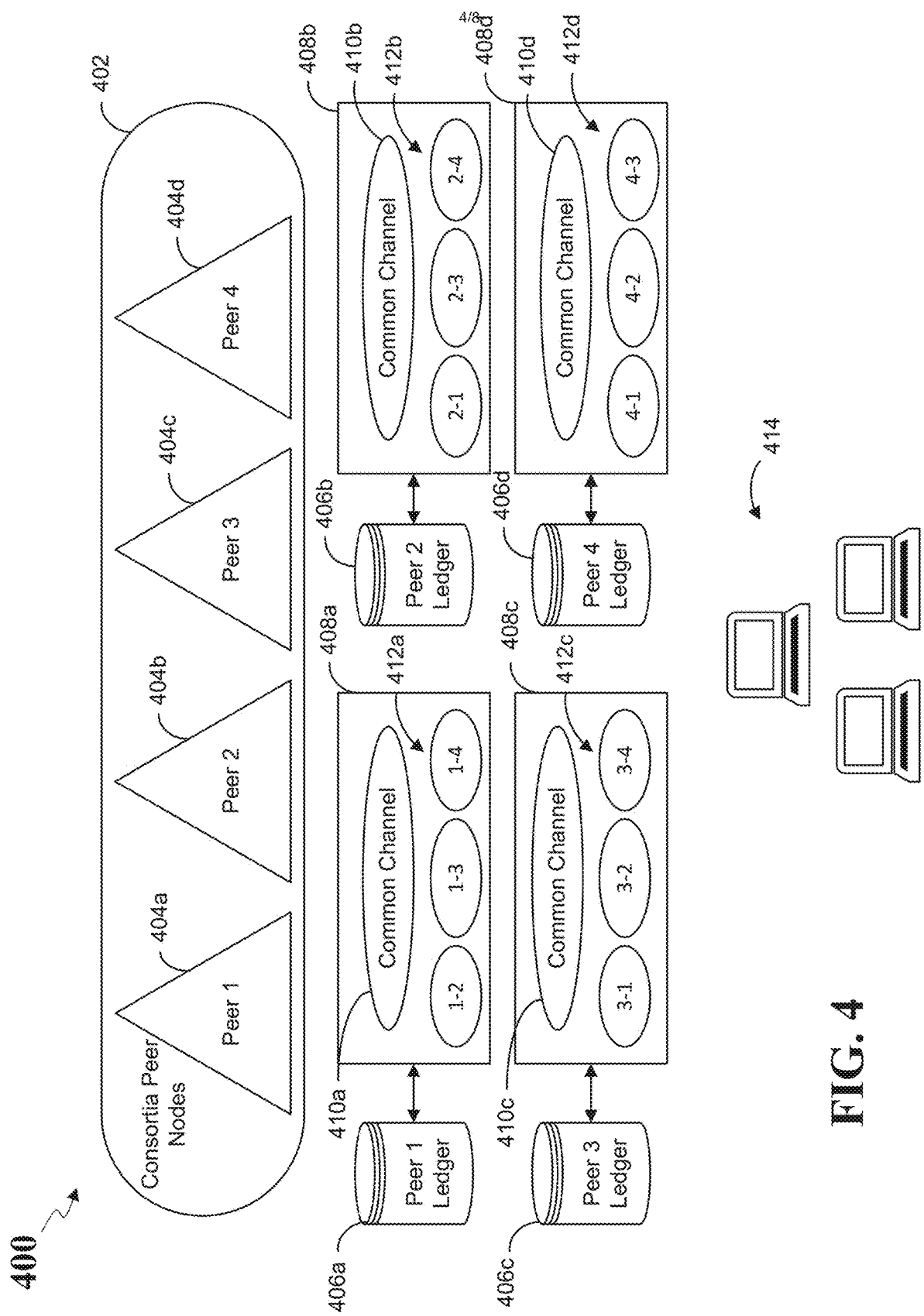
FIG. 4 illustrates another example computer system for maintaining the integrity of transactions across computing systems, according to an embodiment.

FIG. 4 illustrates another example computer system 400 for maintaining the integrity of transactions across computing systems, according to an embodiment. The computer system 400 includes a peer node consortium 402, peer nodes 404a-d, peer node ledgers 406a-d, channels 408a-d, and analytic nodes 414. The peer nodes 404a-d may be computing devices of entities (e.g., affiliates) of the same company and may be the same or similar to the peer nodes 120a-c. The peer node ledgers 406a-d may be ledgers that are stored in local databases of the peer nodes 404a-d. The peer node ledgers 406a-d may cooperate to maintain a distributed ledger of transactions between peer nodes 404a-d and, in some embodiments, regulation blocks specific to each peer node 404a-d including rules for transactions into which the respective peer node 404a-d may enter. The analytic nodes 414 may maintain a similar distributed ledger to the peer node ledgers 406a-d. The channels 408a-d may each include a common channel 410a-d that is accessible to each of peer nodes 404a-d and private channels 412a-d that facilitate private communications between subsets of peer nodes 404a-d.

In an example embodiment, two of the peer nodes 404a-d may enter into a transaction. To do so, the peer nodes 404a-d may communicate via a private channel 412a-d that is specific between the two peer nodes 404a-d. For example, peer node 404a may communicate with peer node 404b via a private channel 412a-d labeled 1-2 or 2-1 in FIG. 4. Their communication may be encrypted such that no peer nodes 404a-d or other computing device outside of peer node 404a and peer node 404b may eavesdrop or sniff their communication.

Continuing with the example above, once peer nodes 404a and 404b agree to terms or attributes of a transaction, peer nodes 404a and 404b may each generate a transaction record comprising transaction attributes for the transaction. Each peer node 404a and 404b may transmit their respective transaction record for the transaction to the analytic nodes 414. A consensus of the analytic nodes 414 may receive or retrieve the transaction records from the peer nodes 404a and 404b. The consensus of the analytic nodes 414 may compare corresponding attributes of each transaction record with each other. Responsive to determining at least one of the transaction attributes of one transaction record does not match a transaction attribute of another transaction record, the consensus of the analytic nodes 414 may transmit a signal to the peer nodes 404a and 404b indicating there is a mismatch and, in some cases, the transaction attribute of the mismatch.

Responsive to the consensus of the analytic nodes 414 determining that the transaction attributes match between the transaction records, the consensus of the analytic nodes 414 may identify blockchains and/or regulation block instances that are associated with peer node 404a and peer node 404b. The consensus of the analytic nodes 414 may identify the blockchain and/or regulation block instances based on transaction attributes in the transaction records that the peer nodes 404a and 404b transmitted to the consensus of the analytic nodes 414. The transaction attributes may comprise a blockchain address (e.g., a pointer to the blockchain) to a ledger maintained by the respective peer node 404a or 404b and/or a block instance address to a regulation block of such a blockchain that stores rules and/or thresholds for the respective peer node 404a and peer node 404b.

The consensus of the analytic nodes 414 may compare the attributes of the transaction to the rules and/or thresholds of the regulation blocks that are associated with the peer nodes 404a and 404b. The consensus of the analytic nodes 414 may determine if the attributes satisfy the rules and/or thresholds of the regulation blocks based on the comparison. Responsive to determining the attributes of the transaction satisfy or comply with the rules and/or thresholds of the regulation blocks, the consensus of the analytic nodes 414 may append a block instance to the blockchain that the analytic nodes 414 maintain to keep track of the transactions that are performed by peer nodes 404a-d. In some embodiments, instead of or in addition to appending the transaction block to the blockchain that is maintained by the analytic nodes 414, the consensus of the analytic nodes may transmit instructions to each of the peer nodes 404a-d causing them to append a block instance corresponding to the transaction to the blockchain maintained by peer nodes 404a-d. The instructions may only include a hash of the data of the transaction to maintain the privacy of the attributes of the transaction from the individual peer nodes that were not privy to the transaction.

In one embodiment, the methods described herein are facilitated by one of the peer nodes 404a-d. For example, two separate entities may seek to enter into a transaction with each other. The two entities may communicate (e.g., via a private channel) and each entity may transmit a transaction record to the peer node 404a-d that is facilitating the transaction. The peer node 404a-d may receive each transaction record and compare the corresponding attributes of the transaction records between each other. Responsive to the peer node 404a-d determining there is a mismatch between transaction attributes, the peer node 404a-d may transmit a signal to the entities indicating the mismatch. However, responsive to the peer node 404a-d determining the transaction attributes match, the peer node 404a-d may identify a block instance (e.g., a regulation block instance) of a blockchain that the peer node 404a-d maintains that stores the rules and/or thresholds for transactions that it facilitates. The peer node 404a-d may compare the attributes of the transaction to the block instance and, responsive to determining the attributes comply with the rules and/or threshold of the block instance, append a block instance identifying the transaction to the same blockchain as the blockchain of the regulation block instance or another blockchain that the peer node 404a-d maintains to keep track of transactions between entities.

Figure 5A:
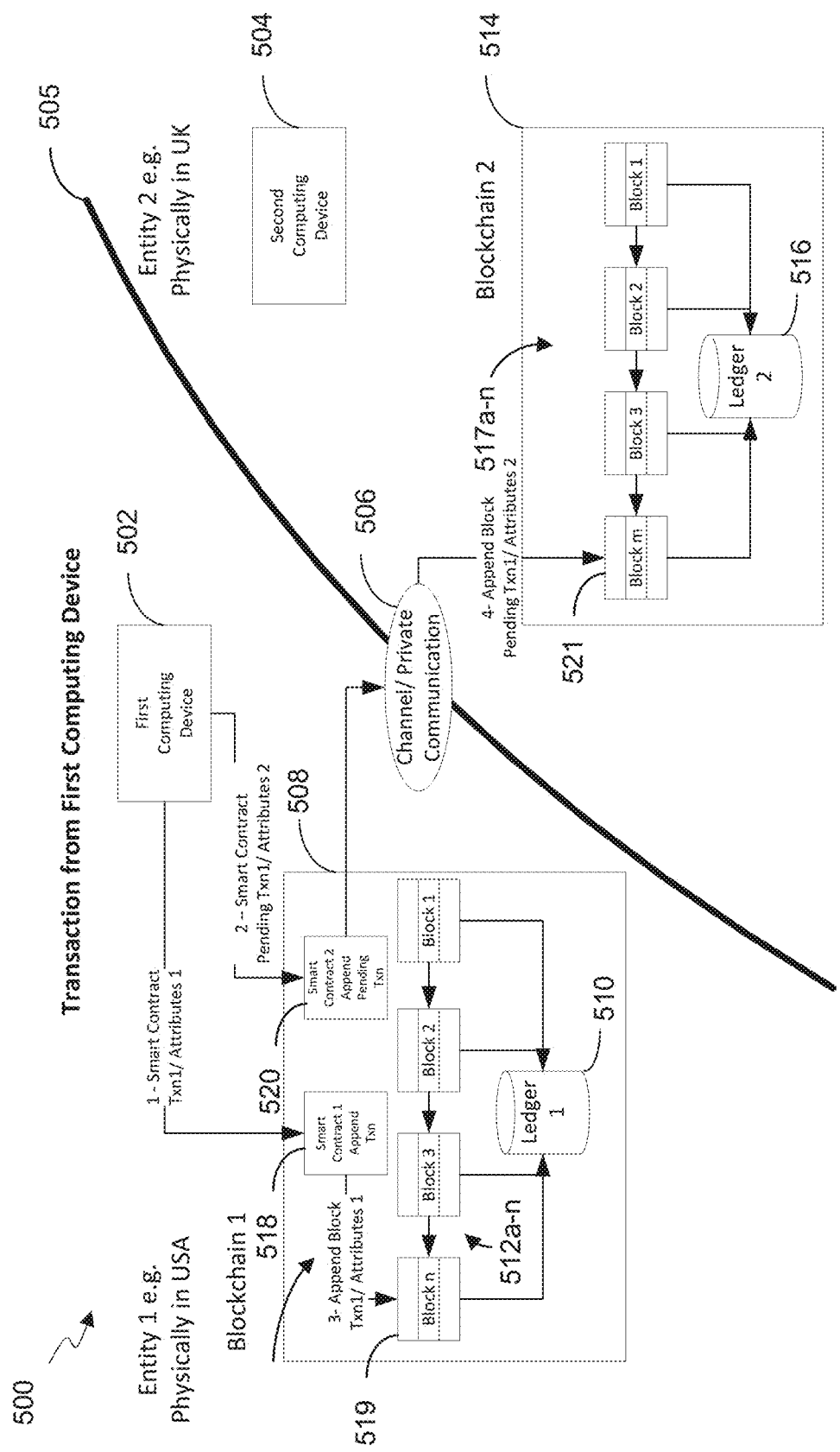
FIG. 5A illustrates another example computer system for maintaining the integrity of transactions across computing systems, according to an embodiment.

FIG. 5A illustrates another example computer system 500 for maintaining the integrity of transactions across computing systems, according to an embodiment. FIG. 5A illustrates the data flow between different components of the computer system 500 during a transaction. The computer system 500 includes a first computing device 502 and a second computing device 504. The first computing device 502 may be in a first location (e.g., the United States) and the second computing device 504 may be in a second location (e.g., Europe or the United Kingdom). As illustrated the computing environments of the first computing device 502 and the second computing device 504 are separated by a geographical separator 505. The first computing device 502 and the second computing device 504 may enter into a transaction by communicating via a private channel 506. The private channel 506 may enable the first computing device 502 and the second computing device 504 to have secure communication that is not accessible to devices outside of the private channel 506. The first computing device 502 may maintain a blockchain 508 that includes a ledger 510 with transaction block instances 512a-n. Each of the transaction block instances 512a-n may include data for transactions that the first computing device 502 has entered into with other computing devices (e.g., the second computing device 504). Similarly, the second computing device 504 may maintain a blockchain 514 including a ledger 516 with transaction block instances 517a-n that each includes data for transactions that the second computing device 504 has entered into with other computing devices (e.g., the first computing device 502).

In one embodiment, when the first computing device 502 enters into a transaction with the second computing device 504, the first computing device 502 and the second computing device 504 may communicate via the private channel 506. Upon reaching an agreement, the first computing device 502 may execute a smart contract protocol 518 to append a block instance 519 to the blockchain 508. The block instance 519 may have a first set of transaction attributes indicating the terms of the transaction. The first computing device 502 may also execute a smart contract protocol 520 to append a block instance 521 to the blockchain 514 of the second computing device 504. The first computing device 502 may do so over the private channel 506. In some embodiments, a portion of the steps of the flow described with reference to FIG. 5A are performed by analytic nodes (or a consensus of the analytic nodes).

Figure 5B:
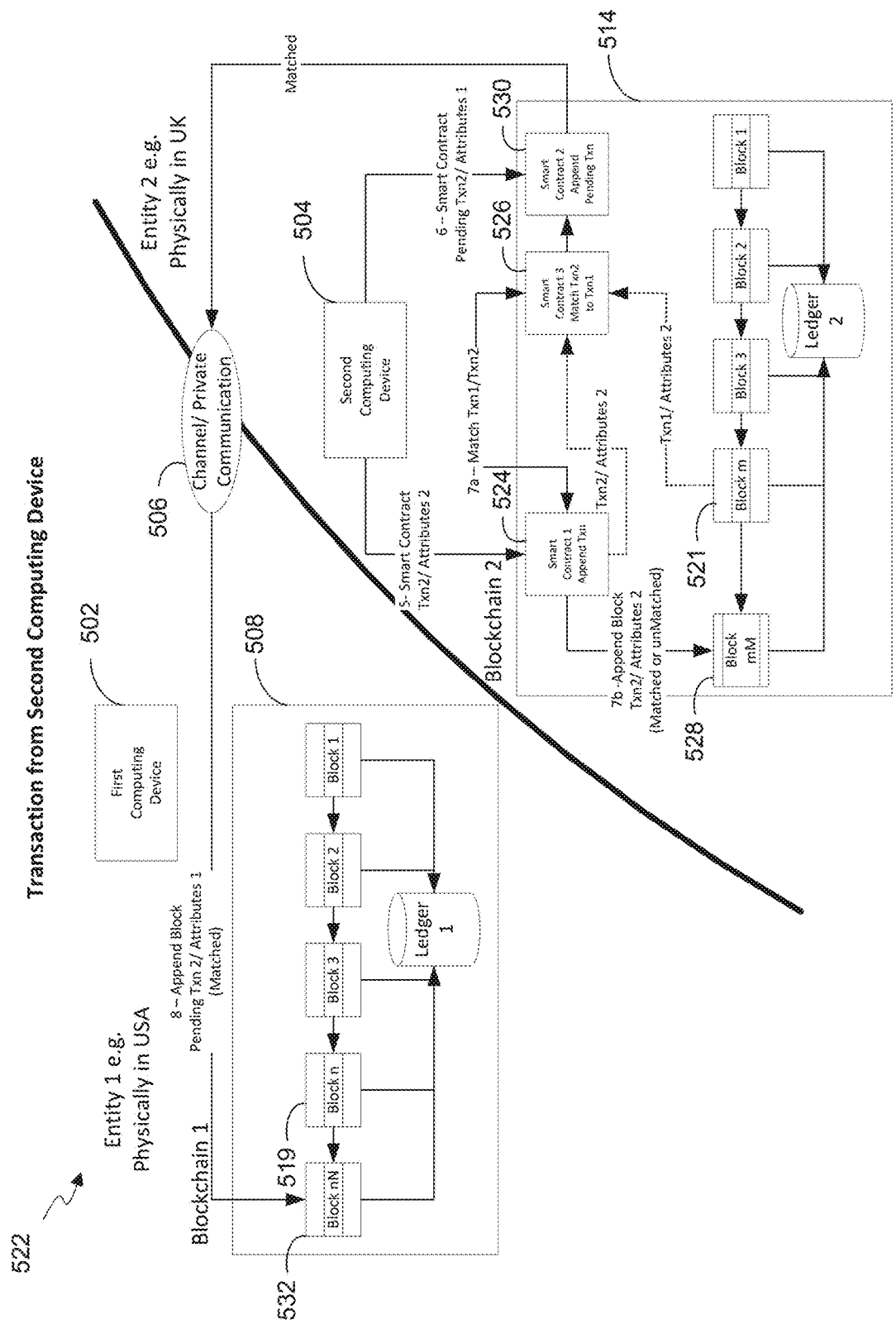
FIG. 5B illustrates another example computer system for maintaining the integrity of transactions across computing systems, according to an embodiment.

FIG. 5B illustrates another example computer system 522 for maintaining the integrity of transactions across computing systems, according to an embodiment. FIG. 5B may illustrate the flow after the first computing device 502 executes the smart contract protocol 520 to append a block instance for a transaction between the first computing device 502 and the second computing device 504 to the blockchain 514 of the second computing device 504, as shown and described with reference to FIG. 5A. The computer system 522 may include the same or similar components to the computer system 500.

Upon the block instance for the pending transaction being appended to the blockchain 514, the second computing device 504 may execute a smart contract protocol 524 to generate a block instance with transaction attributes for the transaction with the first computing device 502. The block instance may include a second set of transaction attributes for the transaction. The second computing device 504 may retrieve or receive the first set of transaction attributes from the block instance 521 of the blockchain 514 of the second computing device 504. The second computing device 504 may execute a smart contract protocol 526 to compare the first set of transaction attributes with the second set of transaction attributes. Upon identifying a match, the second computing device 504 may append the block instance 528 for the transaction to the blockchain 514 (e.g., the block instance 521). Instead or additionally, the second computing device 504 may execute a smart contract protocol 530 to append a block instance 532 to the blockchain 508 (e.g., to the block instance 519) of the first computing device 502. The second computing device 504 may do so over the private channel 506.

In some embodiments, the second computing device 504 may append the block instance 528 to the blockchain 514 in instances in which the sets of transaction attributes do not match. In such instances, the second computing device 504 may append the block instance 528 including the transaction attributes of the second set of transaction attributes to the blockchain 514 and transmit a signal to the first computing device 502 across the private channel 506 indicating that the transaction terms did not match and indicating the transaction attributes of block instance 528. The first computing device 502 may receive the indication and append the block instance 532 to the blockchain 508 with the indicated attributes of the second set of transaction attributes as data of the block instance 532. In some instances, upon receiving the indication from the second computing device 504, the flow described with reference to FIGS. 5A-5B repeats until the first computing device 502 and the second computing device 504 append block instances to their respective blockchains with matching transaction attributes.

In some embodiments, the second computing device 504 may only append the block instance 528 to the blockchain 514 after determining that the second set of transaction attributes comply with regulations of a regulation block as described herein. The second computing device 504 may identify regulations from a regulation block instance of the blockchain 514 or another blockchain that the second computing device 504 maintains and compare the second set of transaction attributes to the regulations of the regulation block. Responsive to determining the second set of transaction attributes comply with the regulation block, the second computing device 504 may append the block instance 528 to the blockchain 514 (e.g., to the block instance 521). In some embodiments, instead of comparing the transaction attributes to a regulation block of a blockchain, the second computing device 504 may compare the transaction attributes to regulations stored in a non-blockchain database stored by or associated with the second computing device 504.

Similarly, in some embodiments, responsive to receiving a signal indicating that the sets of transaction attributes match, the first computing device 502 may compare the transaction attributes of the first set or the second set of transaction attributes to a regulation block of the blockchain 508 or another blockchain that the first computing device 502 maintains or helps maintain. In some embodiments, the first computing device 502 may compare the transaction attributes to regulations stored in a non-blockchain based database stored by or associated with the first computing device 502.

In some embodiments, the second computing device 504 may not append the block instance 528 to the blockchain 514 until the second computing device 504 receives a signal from the first computing device 502 indicating the transaction attributes of the first or second set of transaction attributes comply with the corresponding regulations of the first computing device 502. In some embodiments, a portion of the steps of the flow described with reference to FIG. 5B are performed by analytic nodes (or a consensus of the analytic nodes).

Figure 6:
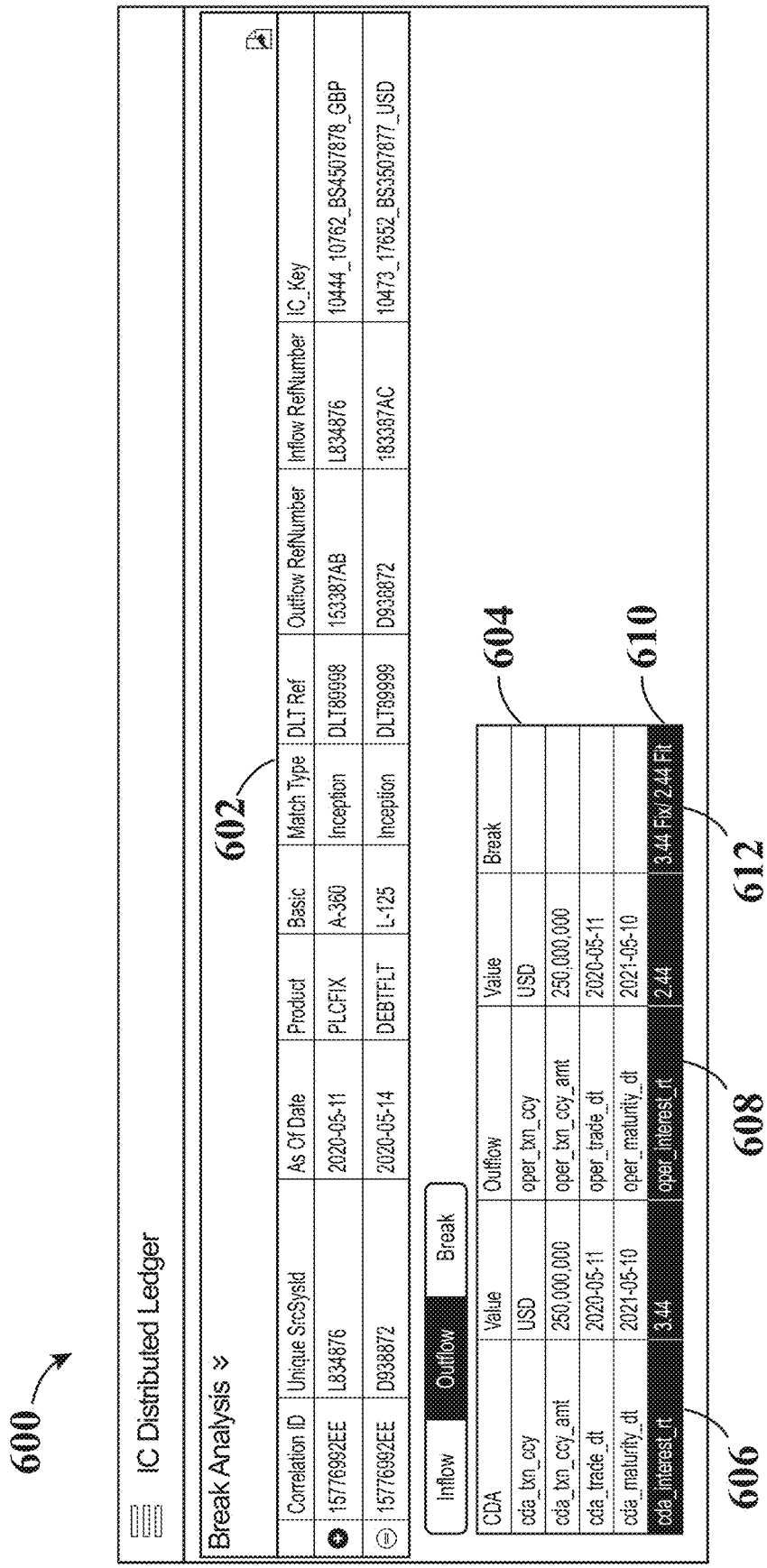
FIG. 6 illustrates a screenshot of an example user interface showing a transaction break analysis for a transaction, according to an embodiment.

FIG. 6 illustrates a screenshot of a user interface 600 showing a transaction break analysis for a transaction, according to an embodiment. The user interface 600 includes a list of transactions 602 and a list of transaction attributes 604. The list of transactions 602 is shown to include different categories with data about the transactions and indications of whether there was a break in the transactions. As illustrated, the list of transaction attributes 604 may be a list of transaction attributes for the transaction with correlation ID "15776992EE." The list of transaction attributes 604 may include a first set of transaction attributes 606 of a transaction record that was generated by one party to the transaction and the values of the transaction attributes. The list of transaction attributes 604 may also include a second set of transaction attributes 608 that was generated by the other party to the transaction and the values of transaction attributes of the second set of transaction attributes 608. A user or an administrator may select the transactions of the list of transactions 602 to view the attributes of the transaction and view or identify any errors that occurred (e.g., differing corresponding transaction attributes) that caused the analytic nodes to reject the transaction. As illustrated, there is a difference between the cda-interest_rt attribute of the first set of transaction attributes 606 and the oper_interest_rt attribute of the second set of transaction attributes 608. The difference has been identified as a break 610 in a break column 612 that identifies breaks or differences in transaction attributes between the first set of transaction attributes 604 and the second set of transaction attributes 608.

FIG. 7 illustrates a screenshot of a user interface 700 showing a transaction break analysis for another transaction, according to an embodiment. The user interface includes a list of transactions 702 and a list of transaction attributes 704. The list of transactions 702 may be the same or similar to the list of transactions 702, shown and described with reference to FIG. 6. The list of transaction attributes 704 may show two sets of transaction attributes and their corresponding values. The two sets of transaction attributes 706 and 708 may be associated with or correspond to the same transaction (e.g., correlation ID "15776992EE"). The set of transaction attributes 706 may correspond to a transaction record generated by a first computing device for a transaction and the set of transaction attributes 708 may correspond to a transaction record generated by a second computing device for the same transaction. As illustrated, the corresponding attributes of the sets of transaction attributes 706 and 708 match with each other except for the maturity date (which is highlighted). The analytic nodes may have identified the maturity dates between the sets of transaction attributes 706 and 706 as not matching by a year and three months. Accordingly, the analytic nodes may identify the maturity date of the transaction as a break 710 in a break column 712 by highlighting the attribute.

In a non-limiting embodiment of the present disclosure, a computer-implemented method may be performed by the consensus of nodes. The method may include receiving a first transaction request from a first computing device, the first transaction request corresponding to a pending transaction between the first computing device and a second computing device and comprising a first set of transaction attributes, and appending a block instance to the blockchain of the first computing device. The method may further include identifying a blockchain of the second computing device based on at least one transaction attribute of the first set of transactions, and appending a block instance of the pending transaction to the blockchain of the second computing device. The method may further include receiving or retrieving, from the second computing device, a second transaction request, the second transaction request corresponding to the pending transaction between the second computing device and the first computing device and comprising a second set of transaction attributes. The method may further include executing a smart contract protocol to compare the second set of transaction attributes with the first set of transaction attributes stored onto the ledger of the blockchain of the second computing device. The method may further include, responsive to determining that the second set of transaction attributes complies with the first set of transaction attributes, appending a block instance of the pending transaction to the blockchain of the second computing device and a block instance of the pending transaction to the blockchain of the first computing device.

The break prevention techniques described herein can be used by systems that host transactions or events between a buyer, a seller, and other parties (e.g., a buy-side payee bank, a buy-side custody bank, a sell-side custody bank, a transfer agent, etc.). A particular pain point of multi-party transactions is the exchange of alternate assets. The exchanges can involve flows that are not digitized and rely on large PDF documents. The exchanges can involve communicating via email. PDF documents attached to the emails with unique embedding requirements. The process can often result in user error in communication or typographical errors. In one example of resolving these and other pain points, a computing device for a buyer (e.g., a buyer computing device) and a computing device for a seller (e.g., a seller computing device) can communicate to complete an event in which an account of the buyer computing device purchases an asset from an account of the seller computing device. The buyer and seller computing devices can be associated with blockchains that respectively host the accounts for the buyer and seller computing devices. To complete the event, the buyer computing device can transmit a first set of event attributes (e.g., values or other characteristics of an event) for the pending event to nodes maintaining the blockchain that hosts or is otherwise associated with the buyer computing device. The nodes maintaining the blockchain may identify different subsets of event attributes from the first set of event attributes and transmit the subsets of event attributes to different sets of nodes. In doing so, the nodes maintaining the blockchain associated with the buyer computing device can transmit the set of event attributes to the nodes maintaining the blockchain associated with the seller computing device. The seller computing device can similarly transmit a second set of event attributes for the pending event to nodes maintaining the blockchain that hosts or is otherwise associated with the seller computing device. The nodes maintaining the blockchain may identify different subsets of event attributes from the second set of event attributes and transmit the subsets of event attributes to different sets of nodes. In doing so, the nodes maintaining the blockchain associated with the seller computing device can transmit the set of event attributes to the nodes maintaining the blockchain associated with the buyer computing device.

The sets of nodes may receive the subsets of event attributes for the pending event from the nodes associated with each of the buyer computing device and the seller computing device. Each set of nodes can compare the attributes received from the buyer computing device with the corresponding attributes received from the seller computing device. The sets of nodes can append a block instance to the blockchains that the nodes respectively maintain responsive to determining event attributes for the buyer computing device and the seller computing device match. Otherwise, the sets of nodes can identify a break and generate an alert or error message. Thus, the sets of nodes can ensure the integrity of the blockchains using cross-blockchain communication to avoid breaks or immutable storage of different data regarding transactions or events performed through the respective sets of nodes.

When completing a transaction or an event, the nodes can write or record each step on the blockchains the nodes respectively maintain. In doing so, the nodes can append block instances to the respective blockchains. Each block can include data for the most recently completed step or action of the event or transaction. For example, each set of nodes that receives a subset or set of event attributes can append a block instance to the blockchains the set of nodes maintains. Accordingly, when determining whether the attributes received for computing devices completing an event or transaction, the sets of nodes can retrieve the data for the event or transaction from the block instances of the blockchains that contain the respective sets or subsets of event attributes. In this way, the sets of nodes can maintain an immutable record (e.g., a file, document, table, listing, message, notification, etc.) of the event attributes that the sets of nodes receive from the computing devices to use to avoid breaks in the chain that may cause the data between different blockchains to differ. Thus, the nodes can increase the data integrity of the data on the different blockchains and reduce the communication between nodes of different blockchains when completing a transaction or event. The nodes can further reduce the number of block instances on the different blockchains that may be generated when the different parties of a transaction or event input different values for transactions or events.

By using the systems and methods described herein, a computer can facilitate the exchange of current or traditional assets in an event. The computer can transmit relevant attributes for a pending event or transaction (e.g., a computing device or account of a computing device subscribing to a fund unit issued by another account or computing device) and subevents across multiple entities. The different entities can each maintain their own legacy systems and interface with a self-hosted or shared distributed ledger blockchain nodes that prevents breaks to improve the data integrity and processing efficiency of managing the events and/or transactions.

Figure 8A:
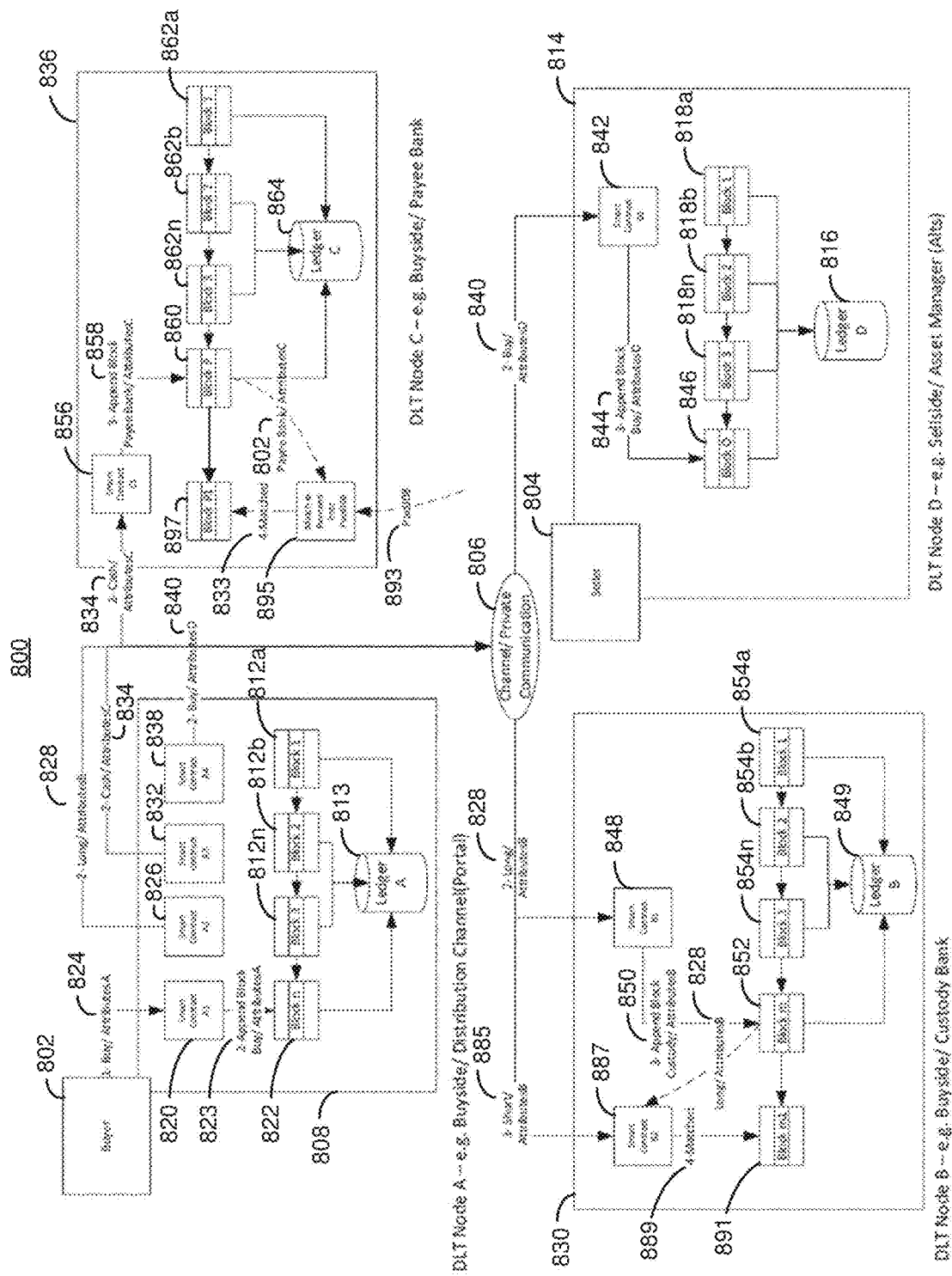
FIG. 8A illustrates an example computer system for maintaining the integrity of events across computing systems, according to an embodiment.

FIG. 8A illustrates another example computer system 800 for maintaining the integrity of transactions across computing systems, according to an embodiment. FIG. 8A illustrates the data flow between different components of the computer system 800 during an event or transaction. The computer system 800 can include a first computing device 802 and a second computing device 804 in communication with different sets of nodes. The different sets of nodes can each maintain a blockchain that stores event or transaction data. The first computing device 802 may be in a first location (e.g., the United States) and the second computing device 804 may be in a second location (e.g., Europe or the United Kingdom). The computing environments of the first computing device 802 and the second computing device 804 can be separated by a geographical separator similar to the geographical separator 505, shown and described with reference to FIGS. 5A and 5B. The steps performed herein by individual sets of nodes can be performed by a consensus of the nodes within the sets.

The first computing device 802 and the second computing device 804 may enter into an event or transaction by communicating via a private channel 806. The private channel 806 may enable the first computing device 802 and the second computing device 804 to have secure communication that is not accessible to devices outside of the private channel 806. The first computing device 802 may communicate with one or more nodes (e.g., computing devices that include a processor and memory) that maintain a blockchain 808. The communication between the different computing devices of the system 800 may be performed using a SWIFT messaging protocol. The nodes maintaining the blockchain 808 may or may not include the first computing device 802. The blockchain 808 can include a ledger 810 with block instances 812a-n. Each of the block instances 812a-n may include data for transactions or events for which the nodes maintaining the blockchain 808 are storing data. The block instances 812a-n and any other block instances of the blockchain 808 can be stored in a ledger 813 (e.g., a database). Similarly, the second computing device 804 may communicate with one or more nodes that maintain a blockchain 814 including a ledger 816 with block instances 818a-n that each includes data for transactions or events for which the nodes maintaining the blockchain 814 store data. The nodes maintaining the blockchain 814 may or may not include the second computing device 804.

In one embodiment, when the first computing device 802 enters into a transaction with the second computing device 804, the first computing device 802 and the second computing device 804 may communicate via the private channel 806. Upon the first computing device 802 and the second computing device 804 reaching an agreement for the event (e.g., agreement to complete the event), the nodes maintaining the blockchain 808 can execute an electronic protocol 820 to append 823 a block instance 822 to the blockchain 808. The block instance 822 may have a first set of event attributes 824 indicating the terms or attributes of the event (e.g., the pending event) between the first computing device 802 and the second computing device 804. Event attributes can be the same as or similar to transaction attributes. The first set of event attributes 824 can be attributes for the event that the first computing device 802 transmits to the nodes maintaining the blockchain 808. The electronic protocol 820 can be a smart contract.

The nodes (e.g., set of nodes) maintaining the blockchain 808 can additionally or instead transmit subsets of the set of event attributes 824 to different sets of nodes maintaining different blockchains. For example, the nodes maintaining the blockchain 808 can execute an electronic protocol 826 to transmit a first subset of event attributes 828 of the set of event attributes 824 to nodes maintaining a blockchain 830. The nodes maintaining the blockchain 808 can execute an electronic protocol 832 to transmit a second subset of event attributes 834 of the set of event attributes 824 to nodes maintaining a blockchain 836. The nodes maintaining the blockchain 808 can execute an electronic protocol 838 to transmit a third subset of event attributes 840 of the set of event attributes 840 to the nodes maintaining the blockchain 814. The third subset of event attributes 840 can be the same as the first set of event attributes 824. The nodes maintaining the blockchain 808 can transmit the event attributes to the different sets of nodes through the private channel 806. The electronic protocols 826, 832, and 838 can each be or include a smart contract.

As described herein, electronic protocols can be or include smart contracts. The electronic protocols can be stored on block instances of blockchains maintained by the nodes executing the electronic protocols. Each set of nodes can include one or a plurality of computing devices.

The nodes maintaining the blockchain 814 can receive the third subset of event attributes 840. Upon receiving the third subset of event attributes 840, the nodes maintaining the blockchain 814 can execute an electronic protocol 842 (e.g., a smart contract). Executing the electronic protocol 842 can cause the nodes maintaining the blockchain 814 to append 844 a block instance 846 to the blockchain 814. The nodes maintaining the blockchain 814 can generate the block instance 846 by including the third subset of event attributes 840 in the block instance 846 and calculating a hash (e.g., using any hashing function, such as SHA, BLAKE2 CRC, MurmurHash, Argon2, MD5, etc.) of the third subset of event attributes 840 and of a hash stored in the immediately preceding block of the blockchain 814 (e.g., the block instance 818n). The nodes maintaining the blockchain 814 can store the calculated hash into the block instance 846, thus linking the block instance 846 with the block instance 818n.

The nodes maintaining the blockchain 830 can receive the first subset of event attributes 828. Upon receiving the first subset of event attributes 828, the nodes maintaining the blockchain 830 can execute an electronic protocol 848 (e.g., a smart contract). Executing the electronic protocol 848 can cause the nodes maintaining the blockchain 830 to append 844 a block instance 852 to the blockchain 830. The nodes maintaining the blockchain 830 can generate the block instance 852 by including the first subset of event attributes 828 in the block instance 852 and calculating a hash (e.g., using any hashing function, such as SHA, BLAKE2 CRC, MurmurHash, Argon2, MD5, etc.) of the first subset of event attributes 828 and of a hash stored in the immediately preceding block of the blockchain 830 (e.g., a block instance 854n of block instances 854a-n stored in a ledger 849 of the blockchain 830). The nodes maintaining the blockchain 830 can store (e.g., insert) the calculated hash into the block instance 852, thus linking the block instance 852 with the block instance 854n.

The nodes maintaining the blockchain 836 can receive the second subset of event attributes 834. Upon receiving the second subset of event attributes 834, the nodes maintaining the blockchain 836 can execute an electronic protocol 856 (e.g., a smart contract). Executing the electronic protocol 856 can cause the nodes maintaining the blockchain 836 to append 858 a block instance 860 to the blockchain 836. The nodes maintaining the blockchain 836 can generate the block instance 860 by including the second subset of event attributes 834 in the block instance 860 and calculating a hash (e.g., using any hashing function, such as SHA, BLAKE2 CRC, MurmurHash, Argon2, MD5, etc.) of the first subset of event attributes 834 and of a hash stored in the immediately preceding block of the blockchain 836 (e.g., a block instance 862n of block instances 862a-n stored in a ledger 864 of the blockchain 836). The nodes maintaining the blockchain 836 can store the calculated hash into the block instance 860, thus linking the block instance 860 with the block instance 862n.

Figure 8B:
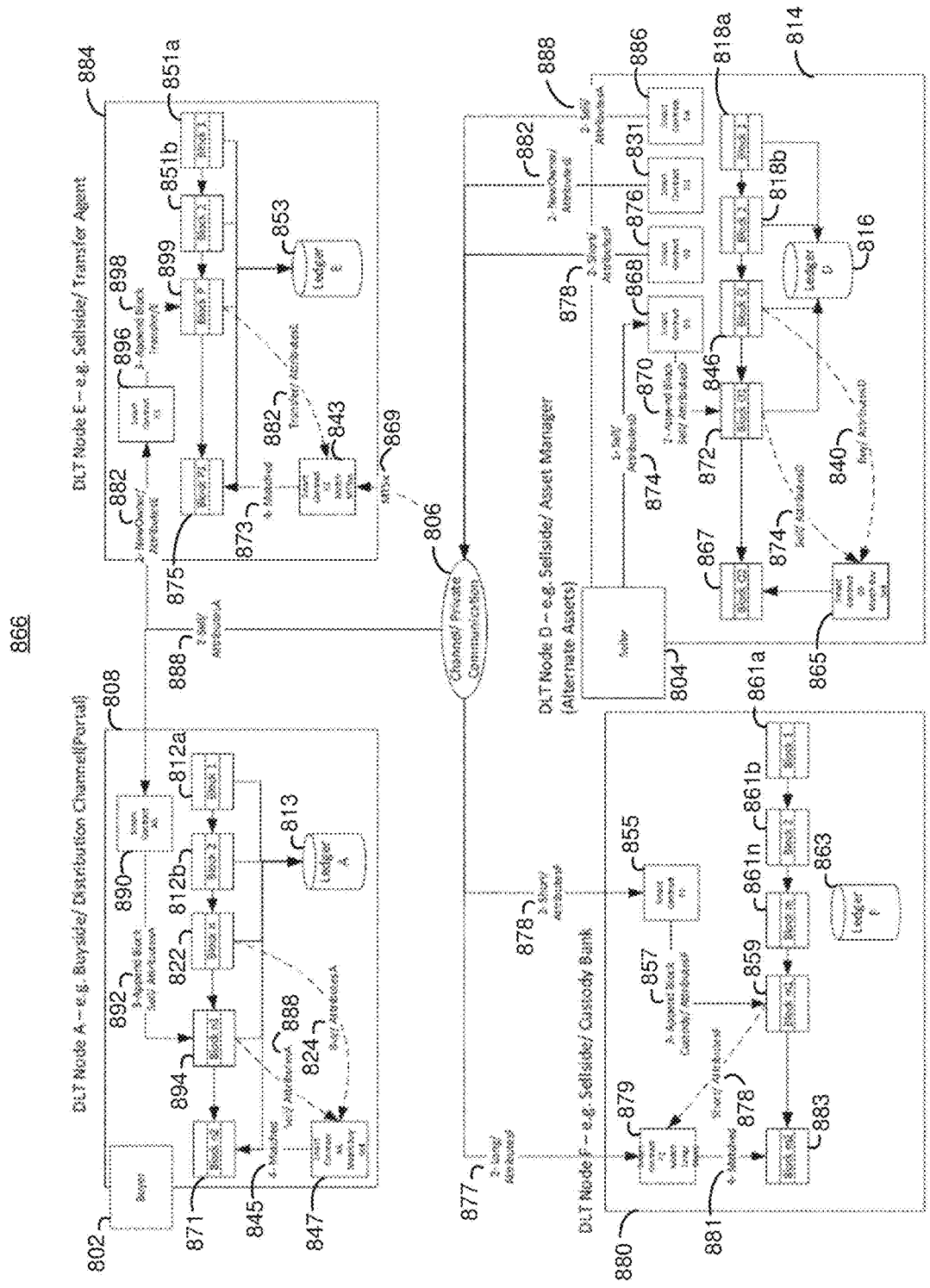
FIG. 8B illustrates another example computer system for maintaining the integrity of events across computing systems, according to an embodiment.

FIG. 8B illustrates another example computer system 866 for maintaining the integrity of transactions across computing systems, according to an embodiment. FIG. 8B may illustrate the flow after the nodes maintaining the blockchain 808 execute the electronic protocols 820, 826, 832, and 838 to cause block instances for an event or transaction between the first computing device 802 and the second computing device 804 to be appended to the blockchains 808, 814, 830, and 836, as shown and described with reference to FIG. 5A. The computer system 566 may include the same or similar components to the computer system 500.

In one embodiment, when the first computing device 802 enters into a transaction with the second computing device 804, the first computing device 802 and the second computing device 804 may communicate via the private channel 806. Upon the first computing device 802 and the second computing device 804 reaching an agreement for the event, the nodes maintaining the blockchain 814 can execute an electronic protocol 868 to append 870 a block instance 872 to the blockchain 814. The block instance 872 may have a second set of event attributes 874 indicating the terms or attributes of the event (e.g., pending event) between the first computing device 802 and the second computing device 804 that the second computing device 804 transmitted to the nodes maintaining the blockchain 814. The electronic protocol 868 can be a smart contract.

The nodes (e.g., set of nodes) maintaining the blockchain 814 can additionally or instead transmit subsets of the second set of event attributes 874 to different sets of nodes maintaining different blockchains. For example, the nodes maintaining the blockchain 814 can execute an electronic protocol 876 to transmit a fourth subset of event attributes 878 of the set of event attributes 874 to nodes maintaining a blockchain 880. The nodes maintaining the blockchain 814 can execute an electronic protocol 831 to transmit a fifth subset of event attributes 882 of the second set of event attributes 874 to nodes maintaining a blockchain 884. The nodes maintaining the blockchain 814 can execute an electronic protocol 886 to transmit a sixth subset of event attributes 888 of the set of event attributes 874 to the nodes maintaining the blockchain 808. The sixth subset of event attributes 888 can be the same as the second set of event attributes 874. The nodes maintaining the blockchain 814 can transmit the event attributes to the different sets of nodes through the private channel 806. The electronic protocols 868, 876, and 880 can each be or include a smart contract.

The nodes maintaining the blockchain 808 can receive the sixth subset of event attributes 888. Upon receiving the sixth subset of event attributes 888, the nodes maintaining the blockchain 808 can execute an electronic protocol 890 (e.g., a smart contract). Executing the electronic protocol 890 can cause the nodes maintaining the blockchain 808 to append 892 a block instance 894 to the blockchain 808. The nodes maintaining the blockchain 808 can generate the block instance 894 by including the sixth subset of event attributes 888 in the block instance 894 and calculating a hash (e.g., using any hashing function, such as SHA, BLAKE2 CRC, MurmurHash, Argon2, MD5, etc.) of the sixth subset of event attributes 888 and of a hash stored in the immediately preceding block of the blockchain 808 (e.g., the block instance 822). The nodes maintaining the blockchain 808 can store the calculated hash into the block instance 894, thus linking the block instance 894 with the block instance 822.

The nodes maintaining the blockchain 884 can receive the fifth subset of event attributes 882. Upon receiving the fifth subset of event attributes 882, the nodes maintaining the blockchain 808 can execute an electronic protocol 890 (e.g., a smart contract). Executing the electronic protocol 890 can cause the nodes maintaining the blockchain 884 to append 898 a block instance 899 to the blockchain 884. The nodes maintaining the blockchain 884 can generate the block instance 899 by including the fifth subset of event attributes 882 in the block instance 899 and calculating a hash (e.g., using any hashing function, such as SHA, BLAKE2 CRC, MurmurHash, Argon2, MD5, etc.) of the fifth subset of event attributes 882 and of a hash stored in the immediately preceding block of the blockchain 884 (e.g., a block instance 851b of block instances 851a-851b of the blockchain 884 stored in a ledger 853). The nodes maintaining the blockchain 884 can store the calculated hash into the block instance 899, thus linking the block instance 899 with the block instance 851b.

The nodes maintaining the blockchain 880 can receive the fourth subset of event attributes 878. Upon receiving the fourth subset of event attributes 878, the nodes maintaining the blockchain 880 can execute an electronic protocol 855 (e.g., a smart contract). Executing the electronic protocol 855 can cause the nodes maintaining the blockchain 880 to append 857 a block instance 859 to the blockchain 880. The nodes maintaining the blockchain 880 can generate the block instance 859 by including the fourth subset of event attributes 878 in the block instance 859 and calculating a hash (e.g., using any hashing function, such as SHA, BLAKE2 CRC, MurmurHash, Argon2, MD5, etc.) of the fourth subset of event attributes 878 and of a hash stored in the immediately preceding block of the blockchain 880 (e.g., a block instance 861n of block instances 861a-861n of the blockchain 880 stored in a ledger 863). The nodes maintaining the blockchain 880 can store the calculated hash into the block instance 859, thus linking the block instance 859 with the block instance 861b.

The nodes that maintain the different blockchains for the transaction between the first computing device 802 and the second computing device 804 can detect breaks, or differences in event attributes between the event attributes for the first computing device 802 and the second computing device 804. For example, the nodes that maintain the blockchain 814 can retrieve the third subset of event attributes 840 from the block instance 846 and the second set of event attributes 874 from the block instance 872. The nodes that maintain the blockchain 814 can do so by executing an electronic protocol 865. Executing the electronic protocol 865, the nodes that maintain the blockchain 814 can compare the second set of event attributes 874 with the third subset of event attributes 840. Responsive to determining the two sets of event attributes match (e.g., determining each value and/or attribute type of the two sets of event attributes match), the nodes maintaining the blockchain 814 can append a block instance 867 to the blockchain 814. The block instance 867 can contain the second set of event attributes 874 and/or the third subset of event attributes 840. The nodes maintaining the blockchain 814 can calculate a hash of the contents of the block instance 867 concatenated with a hash of the block instance 872 and insert the calculated hash into the block instance 867.

The nodes that maintain the blockchain 808 can retrieve the sixth subset of event attributes 888 from the block instance 899 and the first set of event attributes 824 from the block instance 822. The nodes that maintain the blockchain 808 can do so by executing an electronic protocol 847. Executing the electronic protocol 847, the nodes that maintain the blockchain 808 can compare the sixth subset of event attributes 888 with the first set of event attributes 824. Responsive to determining the two sets of event attributes match 845 (e.g., determining each value and/or attribute type of the two sets of event attributes match), the nodes maintaining the blockchain 808 can append a block instance 871 to the blockchain 808. The block instance 871 can contain the sixth subset of event attributes 888 and/or the first set of event attributes 824. The nodes maintaining the blockchain 808 can calculate a hash of the contents of the block instance 871 concatenated with a hash of the block instance 894 and insert the hash into the block instance 871.

The nodes that maintain the blockchain 884 can retrieve the fifth subset of event attributes 882 from the block instance 899. The nodes that maintain the blockchain 884 can receive a message 869 (e.g., a MT5× message or SWIFT message) from the nodes that maintain the blockchain 808 (e.g., the nodes that maintain the blockchain 808 can execute an electronic protocol to transmit the message 869 to the nodes that maintain the blockchain 880). The message 869 can contain a seventh subset of event attributes for the pending transaction between the first computing device 802 and the second computing device 804. The nodes that maintain the blockchain 884 can execute an electronic protocol 843 to compare the fifth subset of event attributes 882 with the seventh subset of event attributes. Responsive to determining a match 873, the nodes maintaining the blockchain 884 can append a block instance 875 to the blockchain 884. The block instance 875 can contain the fifth subset of event attributes 882 and/or the seventh subset of event attributes. The nodes maintaining the blockchain 884 can calculate a hash of the contents of the block instance 875 concatenated with a hash of the block instance 899 and insert the hash into the block instance 875.

The nodes that maintain the blockchain 880 can receive an eighth subset of event attributes 877 from the nodes that maintain the blockchain 808 (e.g., the nodes that maintain the blockchain 808 can execute an electronic protocol to transmit the eighth subset of event attributes 877 to the nodes that maintain the blockchain 880). The nodes that maintain the blockchain 880 can execute an electronic protocol 879 to retrieve the fourth subset of event attributes 878 from the block instance 859 of the blockchain 880. Executing the electronic protocol 879, the nodes that maintain the blockchain 880 can compare the fourth subset of event attributes 878 with the eighth subset of event attributes 877. Responsive to determining a match 881, the nodes maintaining the blockchain 880 can append a block instance 883 to the blockchain 884. The block instance 875 can contain the fifth subset of event attributes 882 and/or the seventh subset of event attributes. The nodes maintaining the blockchain 884 can calculate a hash of the contents of the block instance 875 concatenated with a hash of the block instance 899 and insert the hash into the block instance 875.

Referring again to FIG. 8A, the nodes that maintain the blockchain 830 can receive a ninth subset of event attributes 885 from the nodes that maintain the blockchain 814. The nodes that maintain the blockchain 830 can execute an electronic protocol 887 to retrieve the first subset of event attributes 828 from the block instance 852 of the blockchain 830. Executing the electronic protocol 887, the nodes that maintain the blockchain 880 can compare the ninth subset of event attributes 885 with the first subset of event attributes 828. Responsive to determining a match 889, the nodes maintaining the blockchain 830 can append a block instance 891 to the blockchain 830. The block instance 891 can contain the ninth subset of event attributes 885 and/or the first subset of event attributes 828. The nodes maintaining the blockchain 830 can calculate a hash of the contents of the block instance 891 concatenated with a hash of the block instance 852 and insert the hash into the block instance 891.

The nodes that maintain the blockchain 836 can retrieve the second subset of event attributes 834 from the block instance 860. The nodes that maintain the blockchain 836 can receive a message 893 (e.g., a Pac008 message or SWIFT message) from the nodes that maintain the blockchain 814. The message 893 can contain a tenth subset of event attributes for the pending transaction between the first computing device 802 and the second computing device 804. The nodes that maintain the blockchain 836 can execute an electronic protocol 895 to compare the tenth subset of event attributes with the second subset of event attributes 834. Responsive to determining a match 833, the nodes maintaining the blockchain 836 can append a block instance 897 to the blockchain 836. The block instance 897 can contain the second subset of event attributes 834 and/or the tenth subset of event attributes. The nodes maintaining the blockchain 836 can calculate a hash of the contents of the block instance 897 concatenated with a hash of the block instance 860 and insert the hash into the block instance 897.

In instances in which a set of nodes that maintains a blockchain determines the subsets or sets of event attributes that the set of nodes receives do not match, the set of nodes can determine a break. A break may be an indication that the sets or subsets of event attributes do not match (e.g., that the event attributes provided by the nodes maintaining the blockchain for the second computing device 804 do not match the event attributes provided by the nodes maintaining the blockchain for the first computing device 802). In such instances, the set of nodes can transmit a message back to the sets of nodes maintaining the blockchains 808 and/or 814 to indicate the break. The message can include identifications of any of the event attributes that do not match. The set of nodes maintaining the blockchains 808 or 814 can receive the message and adjust the event attributes for the event or transaction to match with the corresponding attributes provided by the other set of nodes maintaining the blockchains 808 or 814. In some cases, responsive to receiving such a message, the sets of nodes maintaining the blockchains 808 and/or 814 can communicate with each other to resolve the discrepancy. Upon adjusting the event attributes, the sets of nodes can transmit the adjusted set or sets of event attributes to the set of nodes that identified the break. The set of nodes that identified the break can receive the set or sets of event attributes and the set of nodes can repeat the matching processing described herein. The sets of nodes maintaining the blockchains 808 and/or 814 can similarly cure any break identified at other sets of nodes or one or both of the sets of nodes maintaining the blockchains 808 and/or 814. In this way, the nodes can ensure each side of transactions performed between different computing devices has the same data stored for the transactions.

Figure 9:
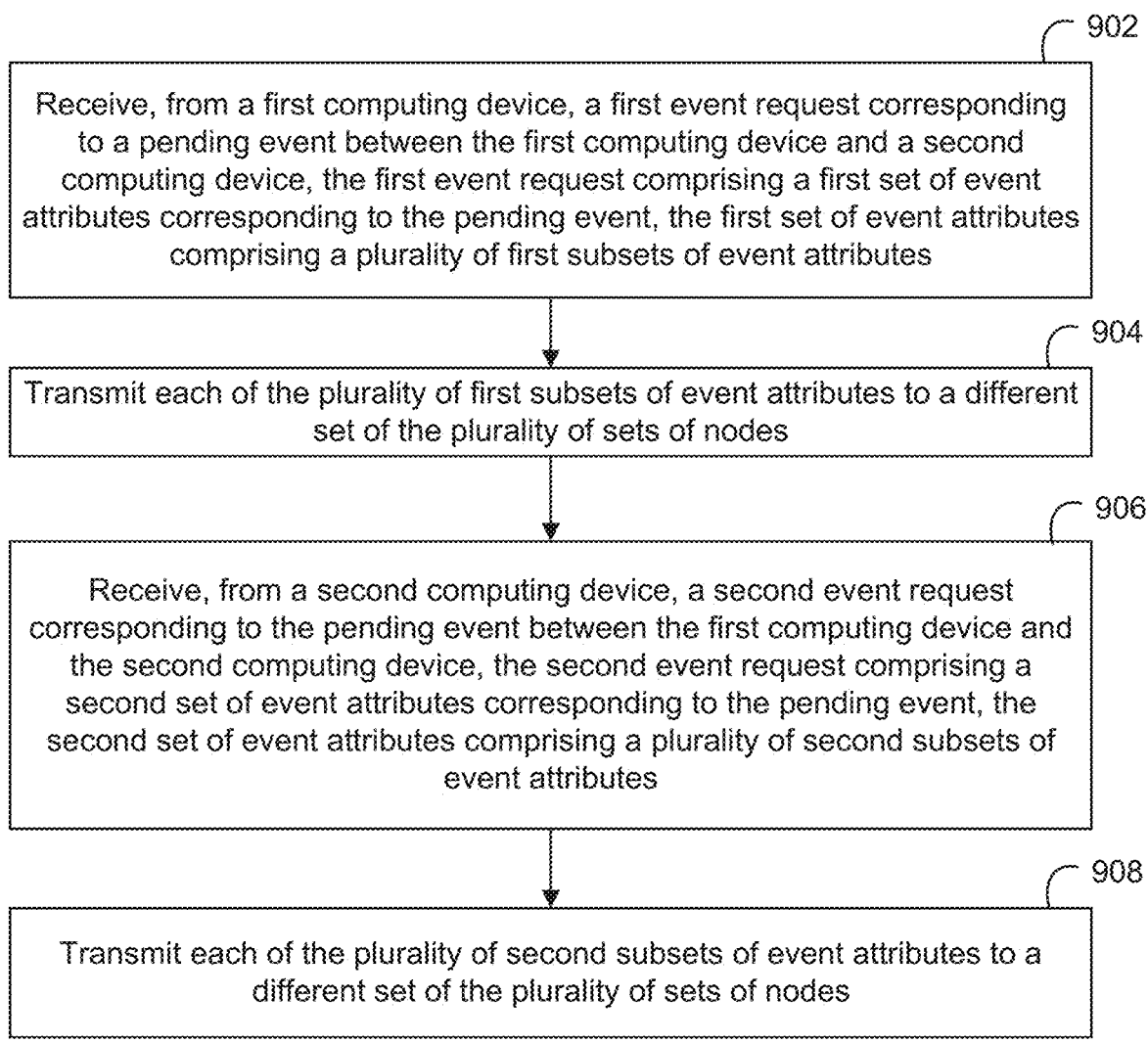
FIG. 9 illustrates a flowchart depicting operational steps for maintaining the integrity of events across computing systems, according to an embodiment.

FIG. 9 illustrates execution of a method 900 for maintaining the integrity of events across computing systems, according to an embodiment. Other embodiments of executing the method 900 may comprise additional or alternative steps, or may omit some steps altogether. Each of the steps of the method 900 may be performed by one or a combination of the analytic nodes, a first computing device, or a second computing device.

At step 902, the analytic nodes (or a consensus of the analytic nodes) may receive an event request. The analytic nodes can receive the event request from a first computing device as a first event request. The first event request can correspond to a pending event between the first computing device and a second computing device. The first event request can include a first set of event attributes corresponding to the pending event. The first set of event attributes can include a plurality of first subsets of event attributes.

The first and second computing devices can communicate with each other across a private channel. The first and second computing devices may access the private channel via a website provided by the analytic nodes. The first and second computing devices can communicate to initiate events or transactions across the private channel without other computing devices or nodes being able to view or access the communications within the channel. The communications on the private channel may be encrypted so only the members of the private channel may read and transmit data between each other via the private channel. For example, the first computing device may initiate an event with the second computing device. The first computing device may transmit a message to the second computing device across their private channel that only they can access to initiate communications for the event. The second computing device may receive the message and communicate back so each of the computing device may negotiate terms or attributes for the communication without any other computing device having access to the communications.

The analytic nodes may be administrative nodes that maintain a blockchain comprising data of the events between peer nodes. As described herein, the analytic nodes may verify the data of the events and, upon verification, append block instances comprising the data of the events to the blockchain.

The first computing device may transmit an event or verification request to the analytic nodes in response to reaching an agreement with the second computing device. The first computing device may generate an event record (e.g., an event request) that corresponds with the pending event between the first and second computing devices. The event record may include event attributes or a set of event attributes. The first computing device may generate the event record automatically based on the agreement between the first computing device and the second computing device or in response to receiving manual user inputs comprising the event attributes associated with the event. The first computing device may format the event record according to the event attributes and include the event record in the event or verification request to the analytic nodes. In some embodiments, the first computing device may also store a copy of the event record in a local database that may be encrypted so it is only accessible to the first computing device.

At step 904, the analytic nodes (or a consensus of the analytic nodes) may transmit a plurality of first subsets of event attributes to the plurality of sets of nodes. For example, upon receiving the set of event attributes from the first computing device, the analytic nodes can divide or group the set of event attributes into different subsets of event attributes. Each of the subsets of event attributes can include values of event attribute types that correspond with a different destination (e.g., a different computing device or set of nodes). The destinations can each be configured to receive and/or process event attributes of the event attribute types in the subset of event attributes. The analytic nodes (or a consensus of the analytic nodes) may transmit each of the plurality of first subsets of event attributes to different sets of the plurality of sets of nodes.

In one example, a subset of event attributes can include event attribute types that correspond with a buyer custody bank. In another example, a subset of event attributes with event attribute types that correspond with a buyer transfer agent. In another example, a subset of event attributes can include event attribute types that correspond with seller custody banks. In another example, a subset of event attributes can include event attribute types that correspond with seller transfer agents. Subsets of event attributes can correspond with any number of entities. Each subset of event attributes can include a different combination of attribute types. In some cases, there may be overlap between different subsets of event attributes, such that different entities may receive one or more of the same event attributes. In some cases, subsets of event attributes may not be included in the set of event attributes that the first computing device transmits to the analytic nodes. Instead, the analytic nodes may receive a set of event attributes for the pending event and determine event attributes for the pending event (e.g., determine the current time or other values based on stored criteria, such as determining a day by which the transaction is to be completed based on a stored timeline or determining a currency for the transaction based on a stored rule indicating the currency based on the location or internet protocol address of the first computing device).

The analytic nodes can determine subsets of event attributes for the different destinations (e.g., the different sets of nodes). For example, the analytic nodes can store a table indicating the different types of event attributes for the different destinations. The different destinations can correspond to different roles (e.g., a buy-side payee bank, a buy-side custody bank, a sell-side custody bank, a transfer agent, etc.) for completing an event. The analytic nodes can identify the attribute types of the event attributes received from the first computing device. The analytic nodes can compare the received attribute types to the table. The analytic nodes can generate individual records for each destination that include event attributes for the event (e.g., a subset of event attributes) for the destination. The analytic nodes can transmit the records to the respective destinations (e.g., to the computing devices of the destinations).

At step 906, the analytic nodes (or a consensus of the analytic nodes) may receive an event request. The analytic nodes can receive the event request from a second computing device as a second event request. The second event request can correspond to the pending event between the first computing device and the second computing device. For example, the first event request and the second event request can each include a matching identifier for the event and/or the same identifiers for the first and second computing devices. The second event request can include a second set of event attributes corresponding to the pending event. The second set of event attributes can include a plurality of second subsets of event attributes. The analytic nodes can determine the second event request and the first event request correspond to the same pending event based on the first and second event request having the matching identifiers for the event or the first and second computing devices.

The second computing device may transmit an event or verification request to the analytic nodes in response to reaching an agreement with the first computing device. The second computing device may generate an event record (e.g., an event request) that corresponds with the pending event between the first and second computing devices. The event record may include event attributes or a set of event attributes. The second computing device may generate the event record automatically based on the agreement between the first computing device and the second computing device or in response to receiving manual user inputs comprising the event attributes associated with the event. The second computing device may format the event record according to the event attributes and include the event record in the event or verification request to the analytic nodes. In some embodiments, the second computing device may also store a copy of the event record in a local database. The local database may be encrypted so it is only accessible to the second computing device.

The second set of event attributes can include a plurality or multiple second subsets of event attributes. The second subsets of event attributes can be similar to the first subsets of event attributes. The analytic nodes can divide the event attributes of the second set of event attributes into the second subsets based on the attribute types of the event attributes and the destinations for the event attributes, as described with respect to the first set of event attributes and the first subsets of event attributes.

At step 908, the analytic nodes (or a consensus of the analytic nodes) may transmit each of the plurality of second subsets of event attributes to a different set of the plurality of sets of nodes. For example, upon receiving the set of event attributes from the first computing device, the analytic nodes can divide or group the set of event attributes into different second subsets of event attributes. The analytic nodes can transmit the different second subsets of event attributes to the destinations for the event between the first computing device and the second computing device. Each of the subsets of event attributes can include values of event attribute types that correspond with a different destination (e.g., a different computing device or set of nodes). The destinations can each be configured to receive and/or process event attributes of the event attribute types in the subset of event attributes.

Each of the plurality of sets of nodes can execute a matching protocol to determine if the subsets of event attributes received from the analytic nodes for the first computing device match the subsets of event attributes received from the analytic nodes receives for the second computing device. For example, each set of nodes can execute (e.g., automatically execute) an electronic protocol to compare the first subset of event attributes that the set of nodes receives for the first computing device with the second subset of event attributes that the set of nodes receives for the second computing device. In doing so, for one set of nodes, for example, the set of nodes (e.g., a consensus of the set of nodes) can identify or determine the event attributes of the first subset of event attributes of the same attribute type as the event attributes of the second subset of event attributes. The set of nodes can compare the event attributes of the same attribute type between the first and second subsets of event attributes. Responsive to determining the first subset of event attributes that the set of nodes receives matches the second subset of event attributes that the set of nodes receives, the set of nodes can append a block instance corresponding to the pending event to a blockchain maintained by the set of nodes. Each set of nodes that receives a first subset of event attributes for the first computing device and a second subset of event attributes for the second computing device can similarly compare event attributes of the same type and append block instances to a blockchain maintained by the respective set of nodes responsive to determining a match. The sets of nodes can transmit a message or alert (e.g., a record) to the first and second computing devices indicating the appending of the block instance to the blockchain or that the event was successful. In some cases, such messages or alerts can include an identification of the set of computing devices that appended the block instance to the blockchain to indicate to the first and second computing devices which aspect of the event was successfully completed (e.g., which party to the event completed the portion of the event corresponding to the party).

In some cases, a set of nodes can receive multiple subsets of event attributes for each of the first computing device and the second computing device. Such may be the case, for example, when the set of nodes is responsible for multiple roles for completing an event (e.g., the set of nodes comprises computing devices of a transfer agent and a custody bank, a buyer bank and seller bank, a buy-side custody bank and a buyer bank, etc.). In these cases, the set of nodes can identify the subsets of events that correspond to each role for the first computing device and the second computing device. The set of nodes can compare the subsets of event attributes for the first computing device and the second computing device that correspond to the same roles of the transaction (e.g., that include attributes of the same attribute types). The set of nodes can do so by executing one or more electronic protocols. The set of nodes can append block instances for the matching subsets of event attributes and generate alerts indicating breaks for the non-matching subsets of event attributes (e.g., transmit messages to the first and second computing devices or sets of nodes associated with the first and second computing devices indicating the breaks and/or the non-matching attributes). A set of nodes can perform any number of roles for a transaction.

In the multi-party event system, different sets of nodes can append block instances to blockchains for an event when there are breaks that were identified at other sets of nodes. For example, a first set of nodes may determine a subset of event attributes received for the first computing device matches a subset of event attributes received for the second computing device for an event. A second set of nodes may determine another subset of event attributes received for the first computing device matches another subset of event attributes received for the second computing device for the same event. The first set of nodes may append a block instance to a blockchain maintained by the first set of nodes responsive to determining the match, irrespective of whether the second set of nodes identified a match. Because the second set of nodes did not identify or determine a match, the second set of nodes may communicate with the first and second computing devices to adjust the event attributes for the event for the first and second computing devices until determining subsets of event attributes for the first and second computing devices match. Thus, different sets of computing devices can confirm different aspects of the same event while other sets of nodes operate to fix or adjust breaks.

In some embodiments, the sets of nodes may only append a blockchain for an event to blockchains the sets of nodes respectively maintain in response to each set of nodes that receives a subset of event attributes determining a match between subsets of event attributes.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a plurality of nodes each corresponding to a computing device having a processor and memory to store data, the plurality of nodes comprising a plurality of sets of nodes, each set of nodes maintaining a different blockchain and corresponding to a different type of destination, wherein one or more computing devices of the plurality of nodes are configured to:
receive, from a first computing device, a first event request corresponding to a pending event between the first computing device and a second computing device, the first event request comprising a first set of event attributes corresponding to the pending event;
divide the first set of event attributes into a plurality of first subsets of event attributes based on a table indicating types of attributes to send to different types of destinations;
transmit the plurality of first subsets of event attributes to the plurality of sets of nodes based on types of destinations of the plurality of sets of nodes such that each of the plurality of sets of nodes receives a different first subset of the plurality of first subsets of event attributes, each first subset of the plurality of first subsets of event attributes having at least one event attribute different from another first subset of the plurality of first subsets of event attributes;
receive, from the second computing device, a second event request corresponding to the pending event between the first computing device and the second computing device, the second event request comprising a second set of event attributes corresponding to the pending event;

divide the second set of event attributes into a plurality of second subsets of event attributes based on the table indicating types of attributes to send to the different types of destinations; and transmit the plurality of second subsets of event attributes to the plurality of sets of nodes based on the types of destinations of the plurality of sets of nodes such that each of the plurality of sets of nodes receives a different second subset of the plurality of second subsets of event attributes, each second subset of the plurality of second subsets of event attributes having at least one event attribute different from another second subset of the plurality of second subsets of event attributes, wherein each set of nodes of the plurality of sets of nodes:

maintains a blockchain;

appends a first block instance comprising a first subset of event attributes corresponding to the pending event of the plurality of first subsets of event attributes that the set of nodes receives to the blockchain;

retrieves the first subset of event attributes corresponding to the pending event of the plurality of first subsets of event attributes that the set of nodes receives from the first block instance of the blockchain in response to receiving a second subset of event attributes corresponding to the pending event of the plurality of second subsets of event attribute;

automatically executes an electronic protocol to compare the first subset of event attributes corresponding to the pending event of the plurality of first subsets of event attributes that the set of nodes receives with the second subset of event attributes corresponding to the pending event of the plurality of second subsets of event attributes that the set of nodes receives; and responsive to determining the first subset of event attributes corresponding to the pending event that the set of nodes receives matches the second subset of event attributes corresponding to the pending event that the set of nodes receives, appends a second block instance corresponding to the pending event to the blockchain maintained by the set of nodes.

2. The system of claim 1, wherein the first computing device communicates the pending event with the second computing device via a private channel that is not accessible to other computing devices.

3. The system of claim 1, wherein the first computing device corresponds to a first set of nodes of the plurality of sets of nodes, the first set of nodes maintaining a first blockchain, and the second computing device corresponds to a second set of nodes, and wherein the first set of nodes:

appends, to the first blockchain, a third block instance comprising the first subset of the first set of event attributes corresponding to the pending event;

receives, from the second set of nodes, the second subset of the second set of event attributes corresponding to the pending event;

retrieves the first subset of event attributes from the third block instance;

compares the first subset of event attributes with the second subset of event attributes; and responsive to determining the first subset of event attributes matches the second subset of event attributes, appends a fourth block instance corresponding to the pending event to the first blockchain, the fourth block instance indicating successful completion of the pending event.

4. The system of claim 3, wherein the first set of nodes:

appends a fifth block instance to the first blockchain between the third block instance and the fourth block instance, the fifth block instance comprising the second subset of event attributes; and retrieves the second subset of event attributes from the fifth block instance, wherein the first set of nodes compares the retrieved second subset of event attributes with the first subset of event attributes.

5. The system of claim 1, wherein the first computing device corresponds to a first set of nodes of the plurality of sets of nodes, and wherein the first set of nodes:

executes a first electronic protocol to transmit a third subset of event attributes of the first set of event attributes to a second set of nodes of the plurality of sets of nodes;

executes a second electronic protocol to transmit a fourth subset of event attributes of the second set of event attributes to a third set of nodes of the plurality of sets of nodes; and executes a third electronic protocol to transmit a fifth subset of event attributes of the second set of event attributes to a fourth set of nodes of the plurality of sets of nodes.

6. The system of claim 5, wherein the first set of nodes executes the first electronic protocol, the second electronic protocol, and the third electronic protocol by respectively executing a first smart contract, a second smart contract, and a third smart contract.

7. The system of claim 5, wherein the third set of nodes:

receives the fourth subset of event attributes from the first set of nodes;

appends, to a blockchain maintained by the third set of nodes, a third block instance comprising the fourth subset of event attributes;

receives a sixth subset of event attributes of the second set of event attributes from the second set of nodes;

compares the fourth subset of event attributes with the sixth subset of event attributes; and appends a fourth block instance to the blockchain maintained by the third set of nodes in response to determining a match between the fourth subset of event attributes and the sixth subset of event attributes.

8. The system of claim 1, wherein the first computing device corresponds to a first set of nodes of the plurality of sets of nodes, wherein the first set of nodes:

transmits a third subset of event attributes of the first set of event attributes for the pending event and a fourth subset of event attributes of the second set of event attributes for the pending event to a second set of nodes; and wherein the second set of nodes:

appends a third block instance comprising the third subset of event attributes for the pending event to a blockchain maintained by the second set of nodes; and appends a fourth block instance comprising the fourth subset of event attributes for the pending event to the blockchain maintained by the second set of nodes.

9. The system of claim 1, wherein the first computing device corresponds to a first set of nodes of the plurality of sets of nodes, the first set of nodes maintaining a first blockchain, and the second computing device corresponds to a second set of nodes, and wherein the first set of nodes:
   appends, to the first blockchain, a third block instance comprising the first subset of the first set of event attributes corresponding to the pending event;
   receives, from the second set of nodes, the second subset of the second set of event attributes corresponding to the pending event;
   retrieves the first subset of event attributes from the third block instance;
   compares the first subset of event attributes with the second subset of event attributes; and
   responsive to determining the first subset of event attributes does not match the second subset of event attributes, generate an alert indicating the first subset of event attributes does not match the second subset of event attributes.

10. The system of claim 1, wherein the one or more computing devices are configured to:
    determine an attribute type for each event attribute of the first set of event attributes and the second set of event attributes; and
    determine whether the event attributes of the first set of event attributes match corresponding event attributes of the second set of event attributes based on the determined attribute types.

11. The system of claim 1, wherein the pending event is a pending exchange of assets.

12. A method comprising:
    receiving, by one or more computing devices of a plurality of nodes and from a first computing device, a first event request corresponding to a pending event between the first computing device and a second computing device, the first event request comprising a first set of event attributes corresponding to the pending event, the plurality of nodes comprising a plurality of sets of nodes corresponding to a different type of destination;
    dividing, by the one or more computing devices, the first set of event attributes into a plurality of first subsets of event attributes based on a table indicating types of attributes to send to different types of destinations;
    transmitting, by the one or more computing devices, the plurality of first subsets of event attributes to the plurality of sets of nodes based on types of destinations of the plurality of sets of nodes such that each of the plurality of sets of nodes receives a different first subset of the plurality of first subsets of event attributes, each first subset of the plurality of first subsets of event attributes having at least one event attribute different from another first subset of the plurality of first subsets of event attributes;
    receiving, by the one or more computing devices from the second computing device, a second event request corresponding to the pending event between the first computing device and the second computing device, the second event request comprising a second set of event attributes corresponding to the pending event;
    dividing, by the one or more computing devices, the second set of event attributes into a plurality of second subsets of event attributes based on the table indicating types of attributes to send to the different types of destinations; and
    transmitting, by the one or more computing devices, each of the plurality of second subsets of event attributes to a different set of the plurality of sets of nodes based on the types of destinations of the plurality of sets of nodes such that each of the plurality of sets of nodes receives a different second subset of the plurality of second subsets of event attributes, each second subset of the plurality of second subsets of event attributes having at least one event attribute different from another second subset of the plurality of second subsets of event attributes,
    wherein each set of nodes of the plurality of sets of nodes:
        maintains a blockchain;
        appends a first block instance comprising a first subset of event attributes corresponding to the pending event of the plurality of first subsets of event attributes that the set of nodes receives to the blockchain;
        retrieves the first subset of event attributes corresponding to the pending event of the plurality of first subsets of event attributes that the set of nodes receives from the first block instance of the blockchain in response to receiving a second subset of event attributes corresponding to the pending event of the plurality of second subsets of event attributes;
        automatically executes an electronic protocol to compare the first subset of event attributes corresponding to the pending event of the plurality of first subsets of event attributes that the set of nodes receives with the second subset of event attributes corresponding to the pending event of the plurality of second subsets of event attributes that the set of nodes receives; and
        responsive to determining the first subset of event attributes corresponding to the pending event that the set of nodes receives matches the second subset of event attributes corresponding to the pending event that the set of nodes receives, appends a second block instance corresponding to the pending event to the blockchain maintained by the set of nodes.

13. The method of claim 12, wherein the first computing device communicates the pending event with the second computing device via a private channel that is not accessible to other computing devices.

14. The method of claim 12, wherein the first computing device corresponds to a first set of nodes of the plurality of sets of nodes, the first set of nodes maintaining a first blockchain, and the second computing device corresponds to a second set of nodes, and the method comprising:
    appending, by the first set of nodes to the first blockchain, a third block instance comprising the first subset of event attributes of the first set of event attributes corresponding to the pending event;
    receiving, by the first set of nodes from the second set of nodes, the second subset of event attributes of the second set of event attributes corresponding to the pending event;
    retrieving, by the first set of nodes the first subset of event attributes from the third block instance;

comparing, by the first set of nodes, the first subset of event attributes with the second subset of event attributes; and responsive to determining the first subset of event attributes matches the second subset of event attributes, appending, by the first set of nodes, a fourth block instance corresponding to the pending event to the first blockchain, the fourth block instance indicating successful completion of the pending event.

15. The method of claim 14, comprising:
appending, by the first set of nodes, a fifth block instance to the first blockchain between the third block instance and the fourth block instance, the fifth block instance comprising the second subset of event attributes; and
retrieving, by the first set of nodes, the second subset of event attributes from the fourth block instance; and
comparing, by the first set of nodes, the retrieved second subset of event attributes with the first subset of event attributes.

16. The method of claim 12, wherein the first computing device corresponds to a first set of nodes of the plurality of sets of nodes, and the method comprising:
executing, by the first set of nodes, a first electronic protocol to transmit a third subset of event attributes of the first set of event attributes to a second set of nodes of the plurality of sets of nodes;
executing, by the first set of nodes, a second electronic protocol to transmit a fourth subset of event attributes of the second set of event attributes to a third set of nodes of the plurality of sets of nodes; and
executing, by the first set of nodes, a third electronic protocol to transmit a fifth subset of event attributes of the second set of event attributes to a fourth set of nodes of the plurality of sets of nodes.

17. The method of claim 16, wherein executing the first electronic protocol, the second electronic protocol, and the third electronic protocol comprises executing, by the first set of nodes and respectively, a first smart contract, a second smart contract, and a third smart contract.

18. The method of claim 16, wherein the third set of nodes:
receiving, by the third set of nodes, the fourth subset of event attributes from the first set of nodes;
appending, by the third set of nodes to a blockchain maintained by the third set of nodes, a third block instance comprising the fourth subset of event attributes;
receiving, by the third set of nodes, a sixth subset of event attributes from the second set of nodes;
comparing, by the third set of nodes, the fourth subset of event attributes with the sixth subset of event attributes; and
appending, by the third set of nodes, a fourth block instance to the blockchain maintained by the third set of nodes in response to determining a match between the fourth subset of event attributes and the sixth subset of event attributes.

19. The method of claim 12, wherein the first computing device corresponds to a first set of nodes of the plurality of sets of nodes, and the method comprising:
transmitting, by the first set of nodes, a third subset of event attributes of the first set of event attributes for the pending event and a fourth subset of event attributes of the second set of event attributes for the pending event to a second set of nodes;
appending, by the second set of nodes to a blockchain maintained by the second set of nodes, a third block instance comprising the third subset of event attributes for the pending event; and
appending, by the second set of nodes, a fourth block instance comprising the fourth subset of event attributes for the pending event to the blockchain maintained by the second set of nodes.

20. The method of claim 12, wherein the first computing device corresponds to a first set of nodes of the plurality of sets of nodes, the first set of nodes maintaining a first blockchain, and the second computing device corresponds to a second set of nodes, and the method comprising:
appending, by the first set of nodes to the first blockchain, a third block instance comprising the first subset of the first set of event attributes corresponding to the pending event;
receiving, by the first set of nodes from the second set of nodes, the second subset of the second set of event attributes corresponding to the pending event;
retrieving, by the first set of nodes, the first subset of event attributes from the third block instance;
comparing, by the first set of nodes, the first subset of event attributes with the second subset of event attributes; and
responsive to determining the first subset of event attributes does not match the second subset of event attributes, generating, by the first set of nodes, an alert indicating the first subset of event attributes does not match the second subset of event attributes.

* * * * *